(12) United States Patent
Oshima et al.

(10) Patent No.: US 6,369,531 B1
(45) Date of Patent: *Apr. 9, 2002

(54) CONTROL SYSTEM FOR HYBRID VEHICLE

(75) Inventors: Yoshikazu Oshima; Yusuke Tatara; Motoshi Ishikawa; Yutaka Tamagawa; Tetsu Sugiyama; Toru Yano, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/679,417

(22) Filed: Oct. 4, 2000

Related U.S. Application Data

(63) Continuation of application No. 09/153,930, filed on Sep. 16, 1998, now Pat. No. 6,140,780.

(30) Foreign Application Priority Data

Sep. 17, 1997 (JP) .............................................. 9-270525

(51) Int. Cl.⁷ ................................................. H02P 3/00

(52) U.S. Cl. ...................... 318/139; 180/65.2; 180/65.4

(58) Field of Search ................. 318/139; 180/65.1–65.8

(56) References Cited

U.S. PATENT DOCUMENTS

| | | | |
|---|---|---|---|
| 4,494,506 A | | 1/1985 | Hayama et al. ............. 123/348 |
| 5,725,064 A | * | 3/1998 | Ibaraki et al. ............. 180/65.2 |
| 5,731,669 A | | 3/1998 | Shimizu et al. ............. 318/139 |
| 5,806,617 A | | 9/1998 | Yamaguchi ................ 180/65.2 |
| 5,821,706 A | | 10/1998 | Koga ......................... 318/139 |
| 5,839,533 A | * | 11/1998 | Mikami et al. ............. 180/165 |
| 5,846,155 A | | 12/1998 | Taniguchi et al. ............. 411/2 |
| 5,862,497 A | * | 1/1999 | Yano et al. ................... 701/22 |
| 5,875,864 A | * | 3/1999 | Yano et al. ................ 180/65.4 |
| 5,899,828 A | * | 5/1999 | Yamazaki et al. ............. 477/4 |
| 5,978,719 A | * | 11/1999 | Yano et al. ................... 701/22 |
| 5,984,033 A | * | 11/1999 | Tamagawa et al. ........ 180/65.2 |
| 6,140,780 A | * | 10/2000 | Oshima et al. ............. 318/139 |

FOREIGN PATENT DOCUMENTS

| | | |
|---|---|---|
| EP | 0 698 520 A1 | 2/1996 |
| JP | 9-135502 | 5/1997 |
| JP | 9-284916 | 10/1997 |

* cited by examiner

*Primary Examiner*—Marlon T. Fletcher
*Assistant Examiner*—Rita Leykin
(74) *Attorney, Agent, or Firm*—Arent Fox Kintner Plotkin & Kahn, PLLC

(57) ABSTRACT

A control system controls a hybrid vehicle having an engine for rotating a drive axle, an electric motor for assisting the engine in rotating the drive axle and converting kinetic energy of the drive axle into electric energy in a regenerative mode, and an electric energy storage unit connected through a drive control circuit to the electric motor, for storing electric energy. The control system has a regenerative quantity determining unit which includes first, second, and third first regenerative quantity establishing units. The first regenerative quantity establishing unit establishes a first regenerative quantity for the electric motor based on a vehicle speed of the hybrid vehicle when the supply of fuel to the engine is stopped upon deceleration of the hybrid vehicle. The second regenerative quantity establishing unit establishes a second regenerative quantity for the electric motor based on a remaining capacity of the electric energy storage unit. The third regenerative quantity establishing unit establishes a third regenerative quantity for the electric motor based on a temperature of the drive control circuit. A pumping loss controlling unit controls pumping losses of the engine based on the first, second, and third regenerative quantities.

5 Claims, 19 Drawing Sheets

FIG.10

| | NE (rpm) | | | | | |
|---|---|---|---|---|---|---|
| | | 0 | 500 | | 9500 | 10000 |
| THROTTLE VALVE OPENING COMMAND $\theta$thCOM (DEGREES) ↓ | 0 | | | | | |
| | 1 | | | | | |
| | ⋮ | | | DEMAND DRIVE POWER POWERcom (KW) | | |
| | 89 | | | | | |
| | 90 | | | | | |

FIG.11

| | VEHICLE SPEED (Km/h) | | | | | |
|---|---|---|---|---|---|---|
| | | 0 | 10 | | 160 | 170 |
| EXTRA OUTPUT POWERex (KW) ↓ | 0 | | | | | |
| | 1 | | | | | |
| | ⋮ | | | RUNNING STATUS QUANTITY VSTATUS (%) | | |
| | 99 | | | | | |
| | 100 | | | | | |

CONTROL SYSTEM FOR HYBRID VEHICLE

This is a Continuation of application Ser. No. 09,153,930 filed Sep. 16, 1998 U.S. Pat. No. 6,140,780. The disclosure of the prior application(s) is hereby incorporated by reference herein in its entirety.

BACKGROUND OF THE INVENTION

1. Field of the Invention

The present invention relates to a control system for controlling a hybrid vehicle having an internal combustion engine and an electric motor as separate propulsion sources, and more particularly to a control system for controlling a hybrid vehicle in regenerating electric energy with an electric motor.

2. Description of the Related Art

There have heretofore been known hybrid vehicles each having an internal combustion engine and an electric motor as separate propulsion sources. There has also been proposed a control system for controlling a hybrid vehicle to increase the regenerative efficiency of an electric motor when it operates in a regenerative mode at the time the hybrid vehicle is decelerating. For example, a control system disclosed in Japanese laid-open patent publication No. 8-112190 fully opens an electrically controlled throttle valve when the electric motor operates in the regenerative mode at the time the hybrid vehicle is decelerating. Accordingly, a mechanical energy loss produced due to pumping losses of the engine when the throttle valve remains closed is reduced, and the kinetic energy of the hybrid vehicle can efficiently be recovered as regenerated energy.

Japanese laid-open patent publication No. 9-135502 discloses a control system for controlling a hybrid vehicle to reduce braking torques applied by engine braking depending on the magnitude of a regenerative braking torque produced by an electric motor when the electric motor operates in a regenerative mode.

The disclosed control system calculates braking torques applied by engine braking when a throttle valve is fully closed and opened, corresponding to the rotational speed of a drive axle at the time the fuel of supply to the engine is stopped while the hybrid vehicle is decelerating. Then, the control system adjusts the regenerative braking torque produced by the electric motor to the range of the calculated braking torques, and operates a throttle valve in an intake passage of the engine in an opening direction depending on the magnitude of the regenerative braking torque produced by the electric motor for thereby reducing the braking torque applied by engine braking. In this manner, an uncomfortable feeling that the driver of the hybrid vehicle has due to a deceleration variation while the hybrid vehicle is running with engine braking applied, and kinetic energy of the hybrid vehicle which has been wasted is recovered as electric energy for better regenerative efficiency.

With the above conventional control system, however, the amount of regenerated energy is limited to the range of the difference between the braking torques produced when the throttle valve is fully closed and opened, and intake air excessively cools the catalytic converter in an exhaust system of the engine because the throttle valve is fully opened while the electric motor is operating in the regenerative mode, with the result that emission characteristics will become impaired when the hybrid vehicle returns from the regenerative mode to an ordinary running mode. Consequently, the control system needs to reduce the regenerative torque generated by the electric motor and to close the throttle valve or to fully close the throttle valve to interrupt the regenerative mode of the electric motor, when the detected temperature of the catalytic converter reaches a predetermined value.

SUMMARY OF THE INVENTION

It is therefore an object of the present invention to provide a control system for controlling a hybrid vehicle having an internal combustion engine and an electric motor which can operate in a regenerative mode, to determine a regenerative quantity for the electric motor from a regenerative quantity established based on the decelerating resistance established depending on the vehicle speed when the hybrid vehicle is decelerated and a regenerative quantity established based on the remaining capacity of an electric energy storage unit or the temperature of a drive control circuit for the electric motor, in order to expand a decelerating range for regenerating operation of the electric motor, and to control a pumping loss control unit for the engine based on the determined regenerative quantity.

Another object of the present invention is to provide a control system for controlling a hybrid vehicle to control a pumping loss control unit capable of preventing a catalytic converter from being excessively cooled, depending on a determined regenerative quantity.

Still another object of the present invention is to provide a control system for controlling a hybrid vehicle, which has a pumping loss control unit for controlling pumping losses of the engine of the hybrid vehicle, the pumping loss control unit comprising an exhaust gas recirculation control unit.

Yet still another object of the present invention is to provide a control system for controlling a hybrid vehicle, which has a pumping loss control unit for controlling pumping losses of the engine of the hybrid vehicle, the pumping loss control unit comprising an intake and exhaust valve control unit.

To achieve the above objects, there is provided in accordance with the present invention a control system for controlling a hybrid vehicle having an engine for rotating a drive axle, an electric motor for assisting the engine in rotating the drive axle and converting kinetic energy of the drive axle into electric energy in a regenerative mode, and electric energy storage means connected through a drive control circuit to the electric motor, for storing electric energy, comprising regenerative quantity determining means including first regenerative quantity establishing means for establishing a first regenerative quantity for the electric motor based on a vehicle speed of the hybrid vehicle when the supply of fuel to the engine is stopped upon deceleration of the hybrid vehicle, second regenerative quantity establishing means for establishing a second regenerative quantity for the electric motor based on a remaining capacity of the electric energy storage means, and third regenerative quantity establishing means for establishing a third regenerative quantity for the electric motor based on a temperature of the drive control circuit, and pumping loss controlling means for controlling pumping losses of the engine based on the first, second, and third regenerative quantities established respectively by the first, second, and third regenerative quantity establishing means.

The pumping loss controlling means comprises means for minimizing the pumping losses of the engine if any one of the second and third regenerative quantities established respectively by the second and third regenerative quantity establishing means is at least the first regenerative quantity established by the first regenerative quantity establishing means, and controlling the pumping losses of the engine based on a difference between the first regenerative quantity and the second or third regenerative quantity if any one of the second and third regenerative quantities established respectively by the second and third regenerative quantity establishing means is smaller than the first regenerative quantity established by the first regenerative quantity establishing means.

According to the present invention, there is also provided a control system for controlling a hybrid vehicle having an engine for rotating a drive axle, an electric motor for assisting the engine in rotating the drive axle and converting kinetic energy of the drive axle into electric energy in a regenerative mode, and electric energy storage means connected through a drive control circuit to the electric motor, for storing electric energy, comprising an energy distribution control unit for determining a drive power to be generated by the electric motor based on a drive power of the hybrid vehicle, a vehicle speed of the hybrid vehicle, a remaining capacity of the electric energy storage means, and a running resistance to the hybrid vehicle, regenerative quantity determining means for determining a regenerative quantity based on the vehicle speed, a decelerating resistance, the running resistance, and the remaining capacity of the electric energy storage means, and pumping loss control means for controlling pumping losses of the engine based on the regenerative quantity determined by the regenerative quantity determining means.

In order to prevent a catalytic converter disposed in an exhaust pipe from being excessively cooled, the pumping loss controlling means has an exhaust gas recirculation control valve for controlling an amount of exhaust gases recirculated from the exhaust pipe of the engine to an intake pipe thereof. The exhaust gas recirculation control valve can be opened to reduce pumping losses of the engine, and can be closed to increase pumping losses of the engine.

The pumping loss controlling means has an intake valve or an exhaust valve of the engine and an actuator for fully opening the intake valve or the exhaust valve. The actuator operates to keep at least one of the intake valve and the exhaust valve open thereby to reduce pumping losses of the engine, and to close the intake valve or the exhaust valve which has been kept open thereby to increase pumping losses of the engine.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 10 is a diagram showing a table for establishing demand drive powers;

FIG. 11 is a diagram showing a table for establishing running status quantities;

DETAILED DESCRIPTION OF THE PREFERRED EMBODIMENTS

Figure 1:
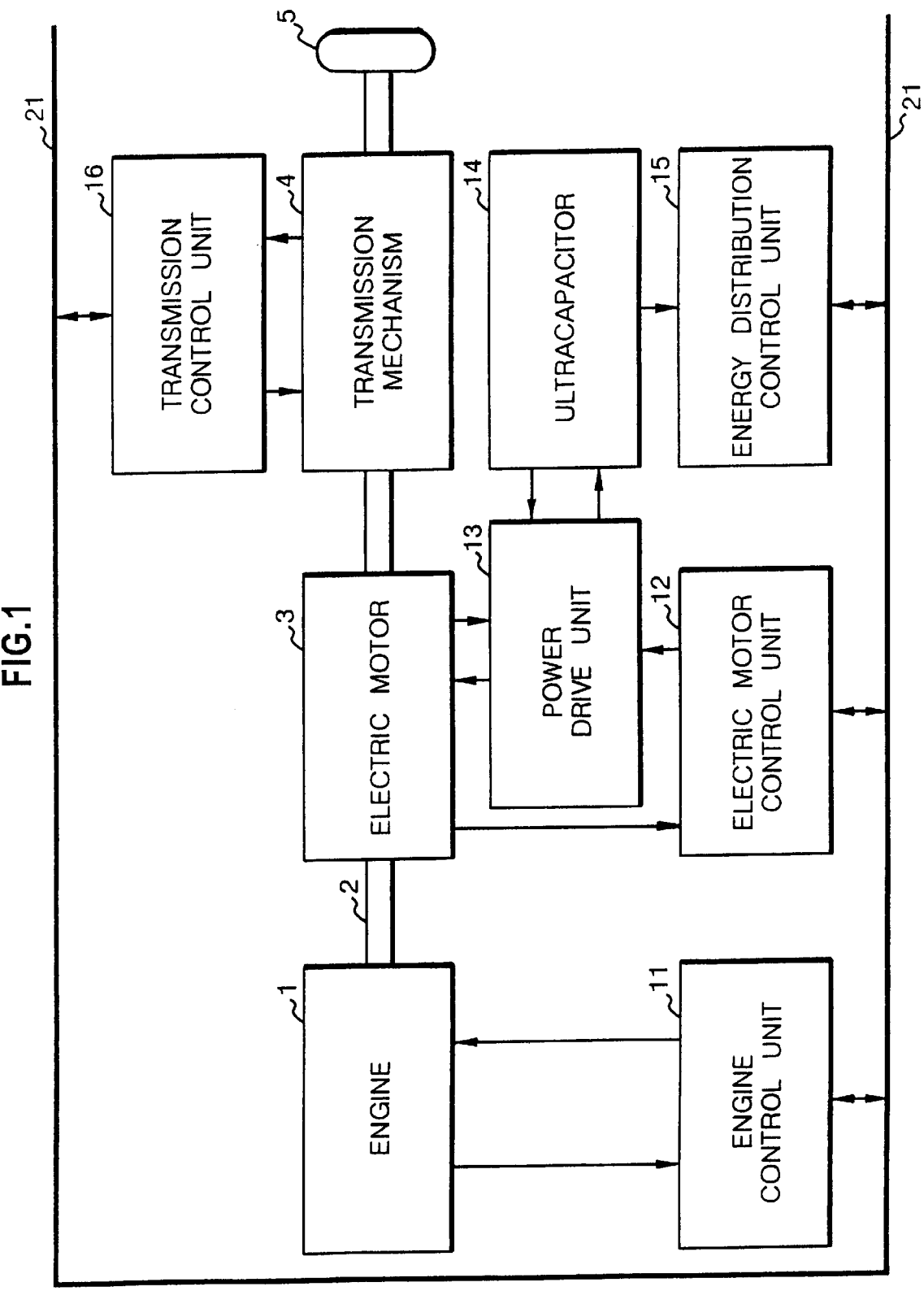
FIG. 1 is a block diagram of a drive apparatus of a hybrid vehicle and a control system therefor according to the present invention.

FIG. 1 shows in block form a drive apparatus of a hybrid vehicle and a control system therefor according to the present invention. Other components of the hybrid vehicle, including sensors, actuators, etc., are omitted from illustration in FIG. 1.

As shown in FIG. 1, the hybrid vehicle has a multicylinder internal combustion engine 1 which rotates a drive axle 2 for rotating drive wheels 5 (only one shown) through a transmission mechanism 4. An electric motor 3 is connected to rotate the drive axle 2 directly. In addition to the ability to rotate the drive axle 2, the electric motor 3 has a regenerative ability to convert kinetic energy produced by the rotation of the drive axle 2 into electric energy. The electric motor 3 is connected to an ultracapacitor (a capacitor having a large electrostatic capacitance) 14 serving as an electric energy storage unit through a power drive unit 13. The electric motor 3 is controlled by the power drive unit 13 to rotate the drive axle 2 and generate electric energy in a regenerative mode.

The control system also has an engine control unit 11 for controlling the engine 1, an electric motor control unit 12 for controlling the electric motor 3, an energy distribution control unit 15 for carrying out energy management based on a determined status of the ultracapacitor 14, and a transmission control unit 16 for controlling the transmission mechanism 4. The engine control unit 11, the electric motor control unit 12, the energy distribution control unit 15, and the transmission control unit 16 are connected to each other through a data bus 21 for exchanging detected data, flags, and other information.

Figure 2:
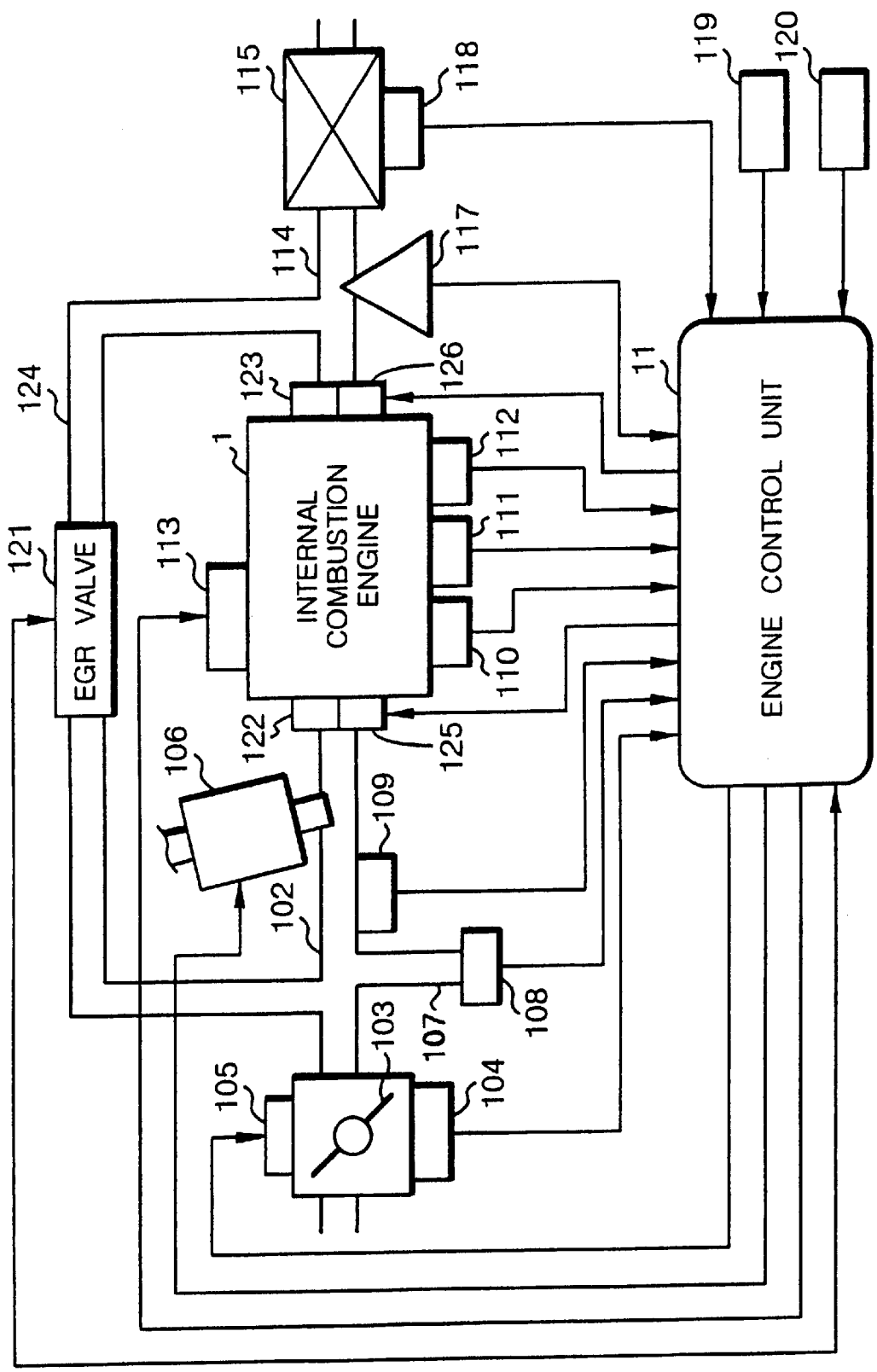
FIG. 2 is a block diagram of an engine control arrangement of the control system.

FIG. 2 shows the engine 1, the engine control unit 11, and ancillary devices thereof. A throttle valve 103 is mounted in an intake pipe 102 connected to the engine 1, and a throttle valve opening sensor 104 is coupled to the throttle valve 103 for generating an electric signal representative of the opening of the throttle valve 103 and supplying the generated electric signal to the engine control unit 11. A throttle actuator 105 for electrically controlling the opening of the throttle valve 103 is coupled to the throttle valve 103. The throttle actuator 105 is controlled for its operated by the engine control unit 11.

A portion of the intake pipe 102 downstream of the throttle valve 13 is connected to an exhaust pipe 114 through an exhaust gas recirculation passage 124 which has an exhaust gas recirculation (EGR) control valve 121 for controlling the amount of exhaust gases flowing through the exhaust gas recirculation passage 124.

The EGR control valve 121 comprises a solenoid-operated valve having a solenoid electrically connected to the engine control unit 11. The valve opening of the EGR control valve 121 can be varied by a control signal that is supplied from the engine control unit 11 to the solenoid of the EGR control valve 121.

An intake pipe absolute pressure (Pba) sensor 108 is connected to the intake pipe 102 through a pipe 107 immediately downstream of the throttle valve 103. The intake pipe absolute pressure sensor 108 generates an electric signal representative of an absolute pressure in the intake pipe 102, and supplies the generated signal to the engine control unit 11.

An intake temperature sensor 109 is mounted on the intake pipe 102 downstream of the intake pipe absolute pressure sensor 108. The intake temperature sensor 109 generates an electric signal representative of the temperature of intake air flowing in the intake pipe 102 and supplies the generated signal to the engine control unit 11.

Fuel injection valves 106 are mounted in the intake pipe 102 at respective positions downstream of the throttle valve 103 and slightly upstream of respective intake valves 122 disposed respectively in the cylinders of the engine 1. The fuel injection valves 106 are connected through a pressure regulator (not shown) to a fuel tank (not shown). The fuel injection valves 106 are electrically connected to the engine control unit 11, which applies signals to the fuel injection valves 106 to control times to open and close the fuel injection valves 106.

An engine coolant temperature sensor 110, which may comprises a thermistor or the like, is mounted on the cylinder block of the engine 1. The engine coolant temperature sensor 110 generates an electric signal representative of the engine coolant temperature and supplies the generated signal to the engine control unit 11.

An engine rotational speed (NE) sensor 111 is mounted near a camshaft or crankshaft (not shown) of the engine 1. The engine rotational speed sensor 111 generates a signal pulse at a predetermined crankshaft angle (hereinafter referred to as a "TDC signal pulse") each time the crankshaft of the engine 1 makes a 180° turn, and supplies the TDC signal pulse to the engine control unit 11.

The engine 1 has ignition plugs 113 positioned at the respective cylinders and electrically connected to the engine control unit 11, which controls the ignition timing of the ignition plugs 113.

The intake valves 122 are disposed respectively in intake ports (not shown) that open into combustion chambers (not shown) of the engine 1 and are connected to the intake pipe 102. Intake valve actuators 125 are coupled to the respective intake valves 122 for keeping the intake valves 122 open or closed and also for controlling the lift and valve opening periods of the intake valves 122. The intake valves 122 can be mechanically operated by a cam shaft (not shown), and also electromagnetically operated by the intake valve actuators 125 out of synchronism with the rotation of the engine 1. The intake valve actuators 125 are controlled for their operation by the engine control unit 11.

Exhaust valves 123 are disposed respectively in exhaust ports (not shown) that open into the combustion chambers of the engine 1 and are connected to the exhaust pipe 114. Exhaust valve actuators 126 are coupled to the respective exhaust valves 123 for keeping the exhaust valves 123 open or closed and also for controlling the lift and valve opening periods of the exhaust valves 123. The exhaust valves 123 can be mechanically operated by a cam shaft (not shown), and also electromagnetically operated by the exhaust valve actuators 126 out of synchronism with the rotation of the engine 1. The exhaust valve actuators 126 are controlled for their operation by the engine control unit 11.

A three-way catalytic converter 115 for purifying toxic components, including HC, CO, NOx, etc. of exhaust gases emitted from the engine 1 is mounted in an exhaust pipe 114 connected to the engine 1. An air-fuel ratio sensor 117 is mounted on the exhaust pipe 114 upstream of the three-way catalytic converter 115. The air-fuel ratio sensor 117 generates an electric signal substantially proportional to the concentration of oxygen (and the shortage of oxygen) in the exhaust gases, and supplies the generated signal to the engine control unit 11. The air-fuel ratio sensor 117 can detect the air-fuel ratio of an air-fuel mixture supplied to the engine 1 through a wide range of air-fuel ratios ranging from a theoretical air-fuel ratio to lean and rich values.

A catalyst temperature sensor 118 is mounted on the three-way catalytic converter 115 for detecting the temperature thereof. The catalyst temperature sensor 118 supplies an electric signal representative of the detected temperature to the engine control unit 11. A vehicle speed sensor 119 for detecting the speed Vcar of the hybrid vehicle and an accelerator opening sensor 120 for detecting the depression (hereinafter referred to as an "accelerator opening") θap of the accelerator pedal are electrically connected to the engine control unit 11. Electric signals generated by the vehicle speed sensor 119 and the accelerator opening sensor 120 are supplied to the engine control unit 11.

A sensor 112 is mounted on the internal combustion engine 1 for generating a pulse each time the crankshaft turns through a predetermined angle. A pulse signal generated by the sensor 112 is supplied to the engine control unit 11, which identifies an engine cylinder into which fuel is to be injected, based on the supplied pulse signal.

The engine control unit 11 comprises an input circuit for shaping the waveforms of input signals from the above various sensors, correcting the voltage levels thereof into predetermined levels, and converging analog signals into digital signals, a central processing unit (hereinafter referred to as a "CPU"), a memory for storing various processing programs to be executed by the CPU and various processed results, and an output circuit for supplying drive signals to the fuel injection valves 106 and the ignition plugs 113. The other control units including the electric motor control unit 12, the energy distribution control unit 15, and the transmission control unit 16 are structurally similar to the engine control unit 11.

Figure 3:
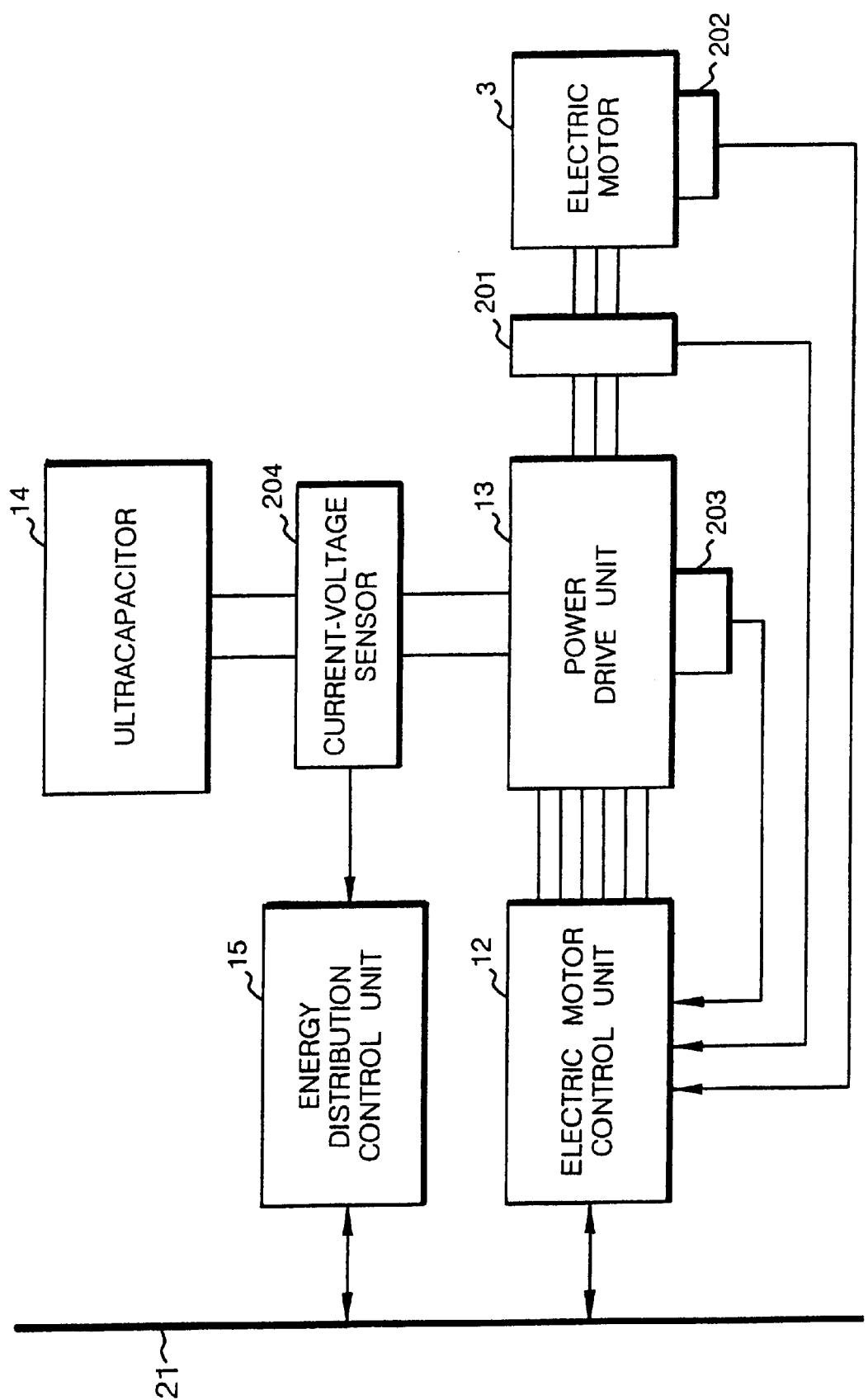
FIG. 3 is a block diagram of an electric motor control arrangement of the control system.

FIG. 3 shows a connected arrangement of the electric motor 3, the power drive unit 13, the ultracapacitor 14, the electric motor control unit 12, and the energy distribution control unit 15.

As shown in FIG. 3, the electric motor 3 is associated with an electric motor rotational speed sensor 202 for detecting the rotational speed of the electric motor 3. An electric signal generated by the electric motor rotational speed sensor 202 as representing the rotational speed of the electric motor 3 is supplied to the electric motor control unit 12. The power drive unit 13 and the electric motor 3 are interconnected by wires connected to a current-voltage sensor 201 which detects a voltage and a current supplied to or outputted from the electric motor 3. A temperature sensor 203 for detecting the temperature of the power drive unit 13, more specifically, the temperature TD of a protective resistor of a drive circuit for the electric motor 3, is mounted on the power drive unit 13. Detected signals from the sensors 201, 203 are supplied to the electric motor control unit 12.

The ultracapacitor 14 and the power drive unit 13 interconnected by wires connected to a current-voltage sensor 204 for detecting a voltage across the ultracapacitor 14 and a current outputted from or supplied to the ultracapacitor 14. A detected signal from the current-voltage sensor 204 is supplied to the energy distribution control unit 15.

Figure 4:
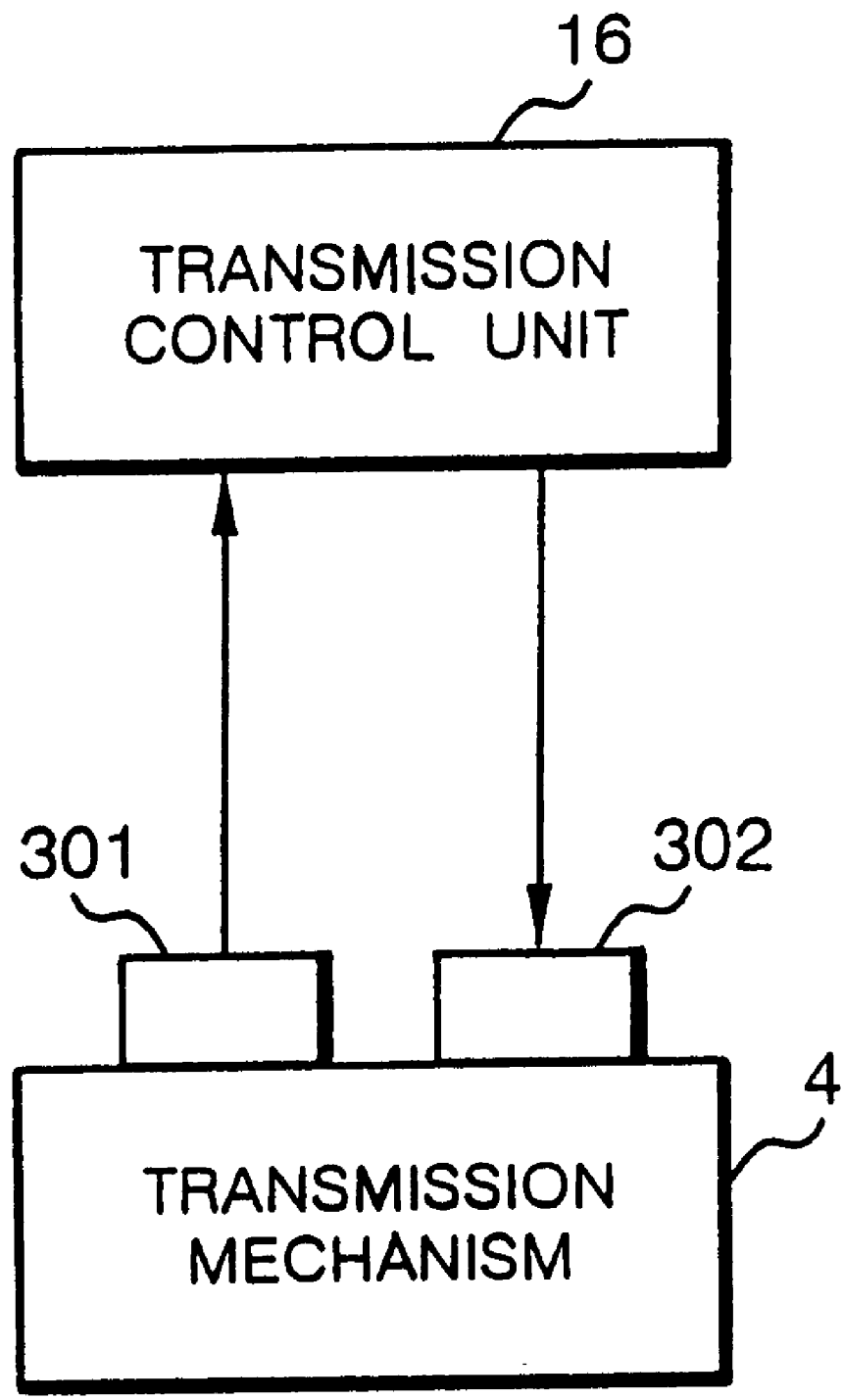
FIG. 4 is a block diagram of a transmission control arrangement of the control system.

FIG. 4 shows a connected arrangement of the transmission mechanism 4 and the transmission control unit 16. The transmission mechanism 4 is associated with a gear position sensor 301 for detecting a gear position of the transmission mechanism 4. A detected signal from the gear position sensor 301 is supplied to the transmission control unit 16. In the illustrated embodiment, the transmission mechanism 4 comprises an automatic transmission mechanism, and is also associated with a transmission actuator 302 which is controlled by the transmission control unit 16 to change gear positions of the transmission mechanism 4.

Figure 5:
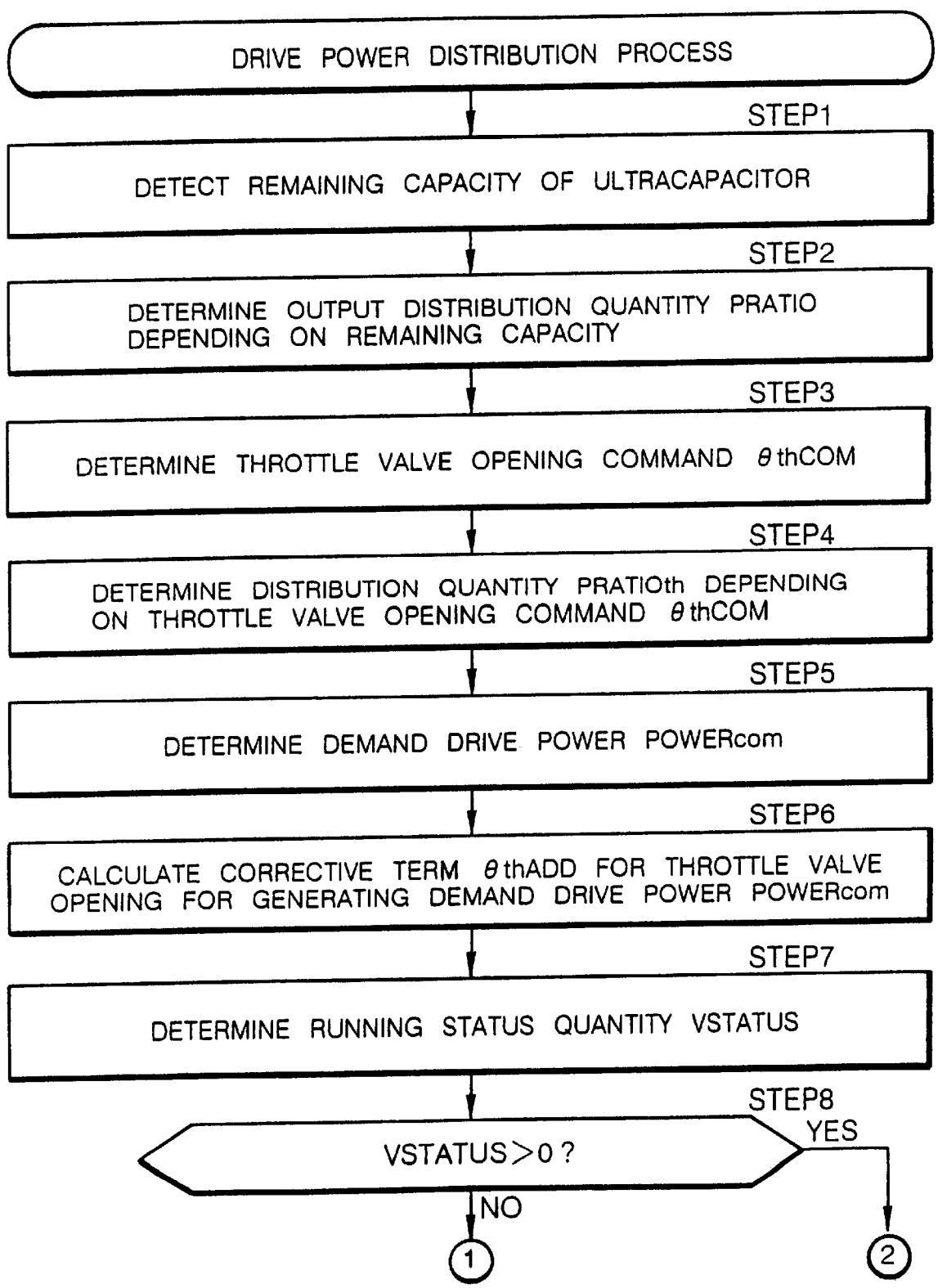
FIGS. 5 and 6 are a flowchart of a processing sequence for calculating an output power to be generated an electric motor, and determining output power distributions for the electric motor and an engine with respect to a demand drive power.
Figure 6:
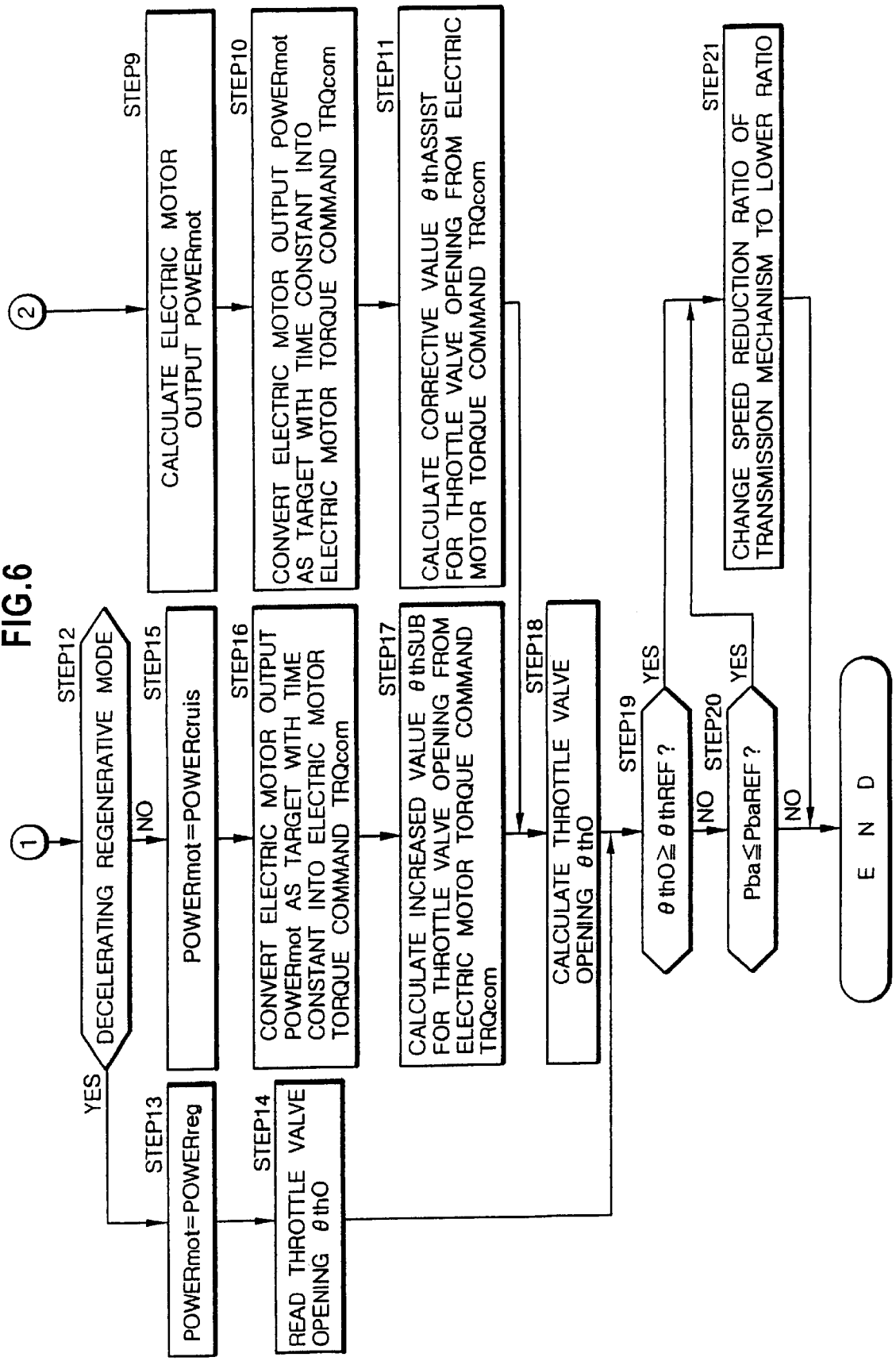

FIGS. 5 and 6 shows a processing sequence for calculating an output power to be generated by the electric motor 3 based on a demand drive power, i.e., a drive power which the drive of the hybrid vehicle demands, and determining output power distributions for the electric motor 3 and the engine 1 with respect to the demand drive power. The processing sequence shown in FIGS. 5 and 6 is executed by the energy distribution control unit 15 in each periodic cycle.

In FIG. 5, the energy distribution control unit 15 detects a remaining capacity of the ultracapacitor 14 in STEP1. Specifically, the energy distribution control unit 15 integrates an output current from the ultracapacitor 14 and an output current (charging current) to the ultracapacitor 14 at each periodic interval, and calculates an integrated discharged value CAPdis (positive value) and an integrated charged value CAPchg (negative value). The energy distribution control unit 15 then calculates a remaining capacity CAPrem of the ultracapacitor 14 according to the following equation (1):

$$CAPrem = CAPful - (CAPdis + CAPchg) \qquad (1)$$

where CAPful represents a dischargeable quantity when the ultracapacitor 14 is fully charged.

The energy distribution control unit 15 corrects the calculated remaining capacity CAPrem based on an internal resistance of the ultracapacitor 14 which varies with temperature, etc., thereby determining a final remaining capacity of the ultracapacitor 14.

Instead of calculating the remaining capacity of the ultracapacitor 14 as described above, the remaining capacity of the ultracapacitor 14 may be determined by detecting an open-circuit voltage across the ultracapacitor 14.

In STEP2, the energy distribution control unit 15 determines an output power distribution quantity for the electric motor 3, i.e., a drive power PRATIO to be generated by the electric motor 3, of a demand drive power POWERcom, using an output power distribution ratio table. The drive power PRATIO is expressed as a ratio to the demand drive power, and will hereinafter be referred to as a "distribution ratio PRATIO".

Figure 7:
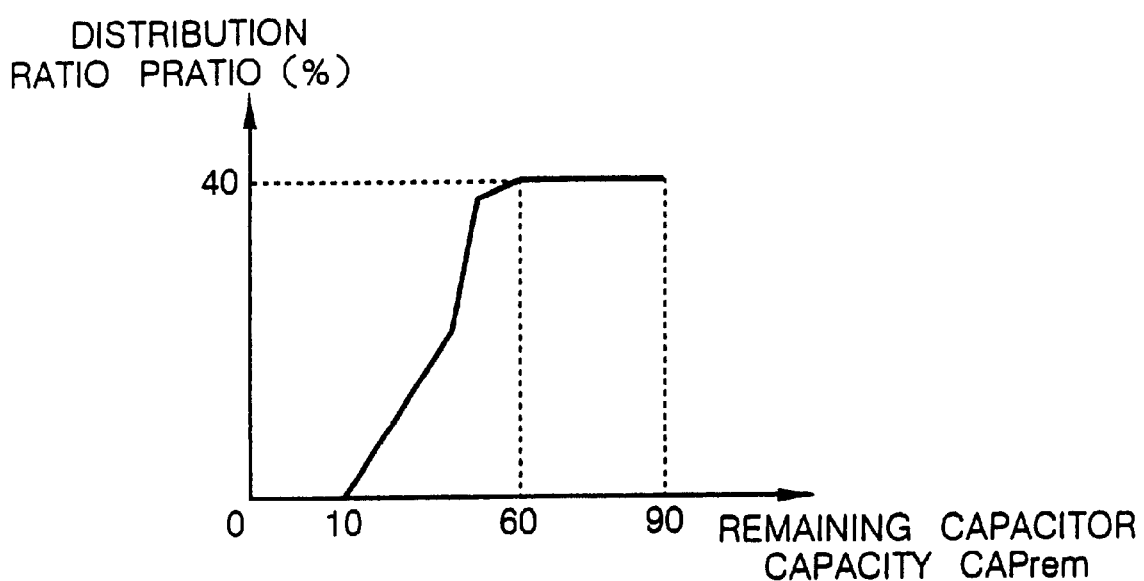
FIG. 7 is a diagram showing the relationship between the remaining capacity of an electric energy storage unit and the output power distribution of the electric motor.

FIG. 7 shows the output power distribution ratio table by way of example. The output power distribution ratio table is in the form of a graph having a horizontal axis which represents the remaining capacity of the ultracapacitor 14 and a vertical axis which represents the distribution ratio PRATIO. The output power distribution ratio table contains predetermined distribution ratios PRATIO with respect to remaining capacities, where the charging and discharging efficiency of the ultracapacitor 14 is maximum.

In STEP3, the energy distribution control unit 15 determines a command (hereinafter referred to as a "throttle valve opening command") θthCOM for the throttle actuator 105, corresponding to an accelerator opening θap detected by the accelerator opening sensor 120, from an accelerator vs. throttle characteristic table shown in FIG. 8.

Figure 8:
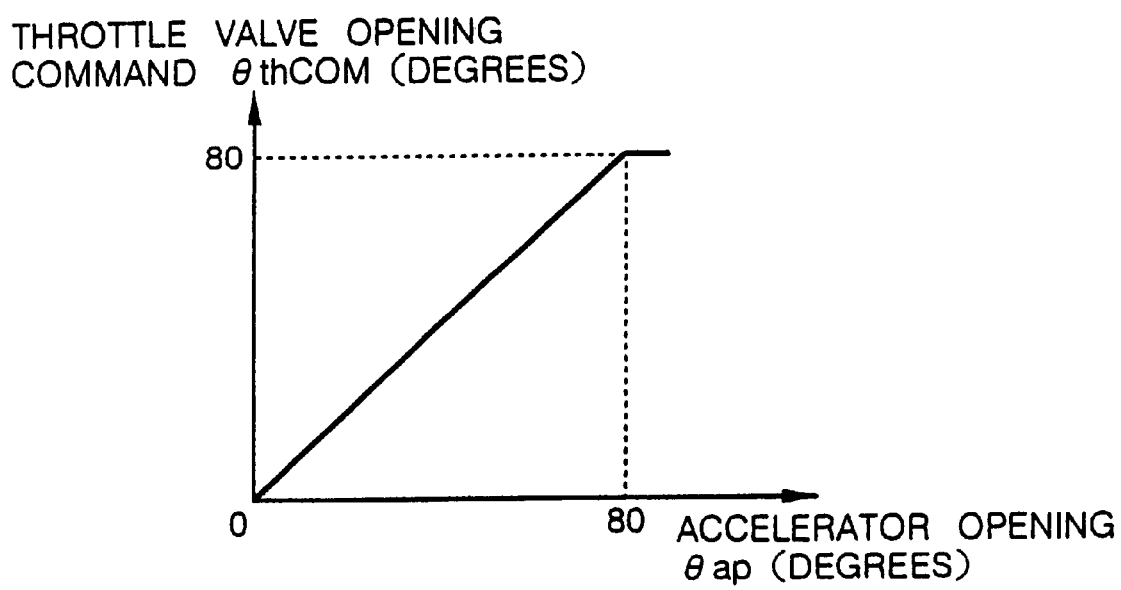
FIG. 8 is a diagram showing the relationship between the amount of operation of an accelerator pedal and the opening of a throttle valve.

The accelerator vs. throttle characteristic table shown in FIG. 8 is in the form of a graph having a horizontal axis which represents the accelerator opening θap and a vertical axis which represents the throttle valve opening command θthCOM. In FIG. 8, values of the accelerator opening θap are equal to corresponding values of the throttle valve opening command θthCOM. However, values of the accelerator opening θap may be different from corresponding values of the throttle valve opening command θthCOM.

Figure 9:
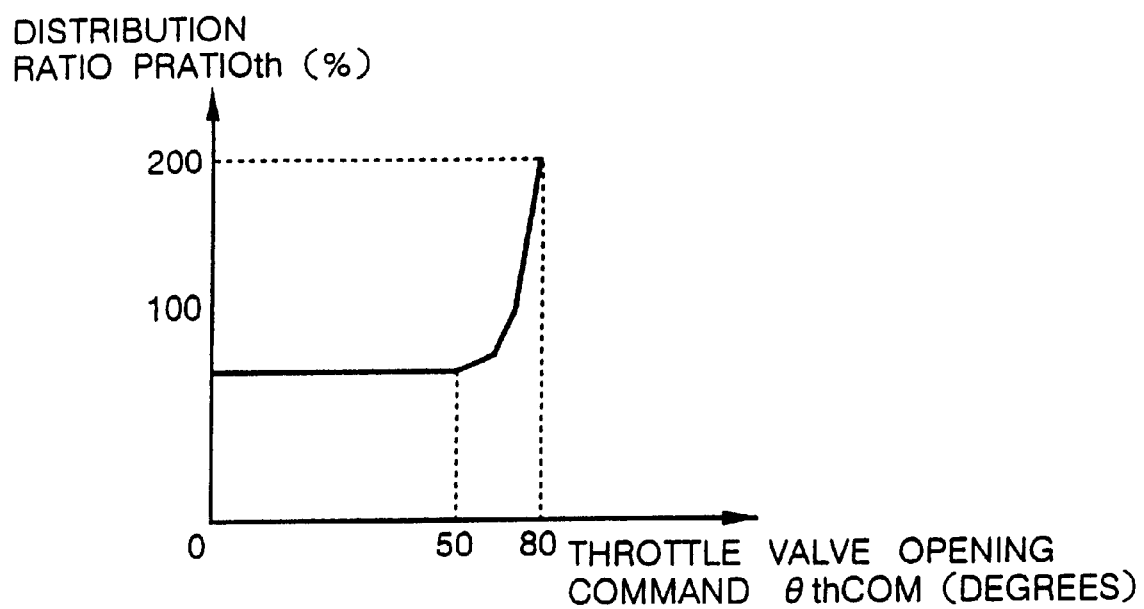
FIG. 9 is a diagram showing the relationship between the opening of the throttle valve and the output power distribution of the electric motor.

In STEP4, the energy distribution control unit 15 determines a distribution ratio PRATIOth for the electric motor 3 corresponding to the determined throttle valve opening command θthCOM from a throttle vs. motor output power ratio table shown in FIG. 9.

The throttle vs. motor output power ratio table shown in FIG. 9 is in the form of a graph having a horizontal axis which represents the throttle valve opening command θthCOM and a vertical axis which represents the distribution ratio PRATIOth. In FIG. 9, the throttle vs. motor output power ratio table is established such that the output power, which is indicated by the distribution ratio PRATIOth, generated by the electric motor 3 is increased when the throttle valve opening command θthCOM is 50 degrees or higher, for example.

While the distribution ratio PRATIOth is determined depending on the throttle valve opening command θthCOM in the illustrated embodiment, the distribution ratio PRATIOth may be determined depending on one or more parameters representing the vehicle speed, the engine rotational speed, etc.

In STEP5, the energy distribution control unit 15 determines a demand drive power POWERcom depending on the throttle valve opening command θthCOM and the engine rotational speed NE from a demand drive power map shown in FIG. 10.

The demand drive power map shown in FIG. 10 is a map for determining a demand drive power POWERcom which the driver of the hybrid vehicle demands. The demand drive power map shown in FIG. 10 contains values of the demand drive power POWERcom depending on values of the throttle valve opening command θthCOM or the accelerator opening θap and values of the engine rotational speed NE.

In STEP6, the energy distribution control unit 15 calculates a corrective term θthADD for the throttle valve opening for generating the demand drive power POWERcom (θthADD=θthCOM−θthi (previous throttle valve opening)).

In STEP7, the energy distribution control unit 15 determines a running status quantity VSTATUS depending on the vehicle speed Vcar detected by the vehicle speed sensor 119 and an extra output power POWERex of the engine 1 from a table for establishing running status quantities shown in FIG. 11. The running status quantity VSTATUS is greater as the vehicle speed Vcar is higher and the extra output power POWERex is greater.

The extra output power POWERex of the engine 1 is calculated according to the following equation (2):

$$POWERex = POWERcom - RUNRST \quad (2)$$

where RUNRST represents a running resistance to the hybrid vehicle, which is the sum of braking torques including a decelerating torque due to pumping losses of the engine when the hybrid vehicle is decelerating, a regenerative torque due to a regenerative resistance, a rolling resistance to the wheels of the hybrid vehicle, and an air resistance to the hybrid vehicle. The running resistance RUNRST is determined from a RUNRST table shown in FIG. 12. The RUNRST table is established such that the running resistance RUNRST is greater as the vehicle speed Vcar is higher, with the EGR control valve 121 being fully open.

The running status quantity VSTATUS determined by the vehicle speed Vcar and the extra output power POWERex corresponds to an assistive distribution ratio of the electric motor 3 with respect to the extra output power POWERex, and may be set to integral values (%) ranging from 0 to 200. If the running status quantity VSTATUS is "0", then the hybrid vehicle is in a running status not to be assisted by the electric motor 3, i.e., the hybrid vehicle is decelerating or cruising. If the running status quantity VSTATUS is greater than "0", then the hybrid vehicle is in a running status to be assisted by the electric motor 3.

In STEP8, the energy distribution control unit 15 decides whether the running status quantity VSTATUS is greater than "0" or not. If VSTATUS>0, i.e., if the hybrid vehicle is in a running status to be assisted by the electric motor 3, then the hybrid vehicle enters an assistive mode, and control goes from STEP8 to STEP9 shown in FIG. 6. If VSTATUS≤0, i.e., if the hybrid vehicle is decelerating or cruising, then the hybrid vehicle enters a regenerative mode (i.e., a decelerating regenerative mode or a cruise charging mode), and control goes from STEP8 to STEP12 shown in FIG. 6.

In STEP9, the energy distribution control unit 15 calculates an electric motor output power POWERmot according to the following equation (3):

$$POWERmot = POWERcom \times PRATIO \times PRATIOth \times VSTATUS \quad (3)$$

In STEP10, the energy distribution control unit 15 converts the electric motor output power POWERmot as a target with a time constant into an electric motor torque command TRQcom.

Figure 13:
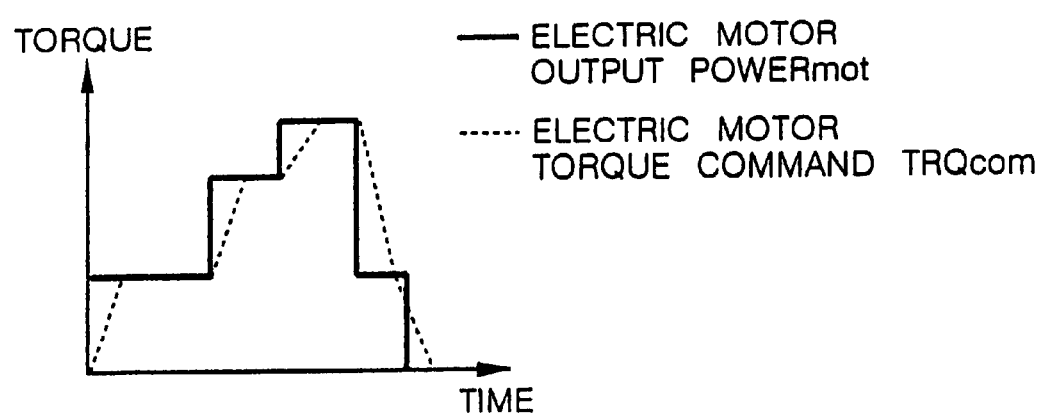
FIG. 13 is a diagram showing the relationship between the output power of the electric motor and a torque command for the electric motor.

FIG. 13 shows the relationship between the electric motor output power POWERmot and the electric motor torque command TRQcom. In FIG. 13, the solid-line curve illustrates the electric motor output power POWERmot as it changes with time, and the dotted-line curve illustrates the electric motor torque command TRQcom as it changes with time.

Figure 12:
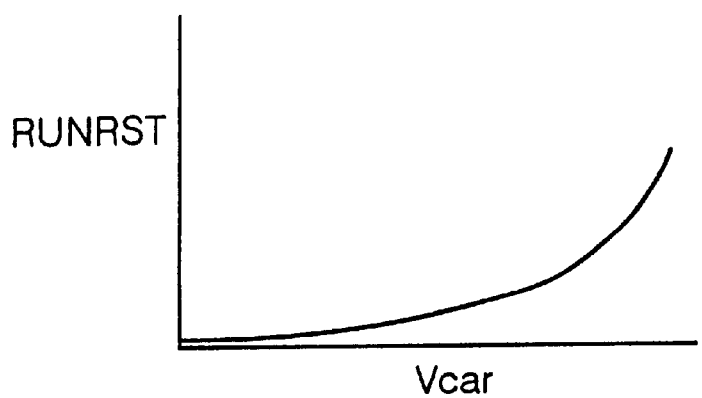
FIG. 12 is a diagram showing a table of running resistances RUNRST.

As can be seen from FIG. 12, the electric motor torque command TRQcom is controlled so as to approach the electric motor output power POWERmot as a target with a time constant, i.e., with a time delay. If the electric motor torque command TRQcom were established such that the electric motor 3 would generate the electric motor output power POWERmot immediately in response to the electric motor torque command TRQcom, then since an increase in the output power of the engine 1 would be delayed, the engine 1 would not be readied to accept the electric motor output power POWERmot immediately, with the result that the drivability of the hybrid vehicle would be impaired. It is necessary, therefore, to control the electric motor 3 to generate the electric motor output power POWERmot until the engine 1 becomes ready to accept the electric motor output power POWERmot.

In STEP11, the energy distribution control unit 15 calculates a corrective quantity θthASSIST for controlling a target value θthO for the throttle valve opening in a valve closing direction, depending on the electric motor torque command TRQcom. Thereafter, control goes from STEP11 to STEP18.

The corrective quantity θthASSIST serves to reduce the output power of the engine 1 by an amount commensurate with the increase in the output power of the electric motor 3 responsive to the electric motor torque command TRQcom. The corrective quantity θthASSIST is calculated for the following reasons:

When the target value θthO for the throttle valve opening is determined by the corrective term θthADD calculated in STEP6 from the throttle valve opening command θthCOM determined in STEP3 and the previous throttle valve opening θthi, and the throttle actuator 105 is controlled by the target value θthO, the demand drive power POWERcom is generated solely from the output power of the engine 1. Therefore, if the output power of the engine 1 were controlled with the target value θthO not corrected by the corrective quantity θthASSIST, and the electric motor 3 were controlled by the electric motor torque command TRQcom converted in STEP10, the sum of the output power of the engine 1 and the output power of the electric motor 3 would exceed the demand drive power POWERcom, resulting in a drive power greater than the demand drive power demanded by the driver. To avoid this problem, the output power of the engine 1 is reduced by an amount commensurate with the output power of the electric motor 3, and the corrective quantity θthASSIST is calculated such that the sum of the output power of the engine 1 and the output power of the electric motor 3 will be equalized to the demand drive power POWERcom. The target value θthO for the throttle valve 103 is then determined (θthO=θthi+θthADD−θthASSIST), and the throttle valve 103 is controlled according to the target value θthO for suppressing the output power of the engine 1.

Furthermore, when the electric motor output power POWERmot is greater than the demand drive power POWERcom, since the target value θthO for the throttle valve 103 is equal to or smaller than the difference between the throttle valve opening command θthCOM and the corrective quantity θthASSIST (θthO≤θthCOM−θthASSIST), the target value θthO becomes nil (θthO=0). The demand drive power POWERcom is all generated by the electric motor 3, and the output power of the engine 1 is kept at a zero level.

When the remaining capacity of the ultracapacitor 14 is reduced thereby to reduce the output power of the electric motor 3, if the electric motor output power POWERmot is smaller than the demand drive power POWERcom, then the corrective quantity θthASSIST is calculated so as to increase the output power of the engine 1, and the target value θthO for the throttle valve 103 is determined (θthO=θthi+θthADD+θthASSIST), and the output power of the engine 1 is controlled according to the target value θthO for generating the demand drive power POWERcom.

In STEP12, the energy distribution control unit 15 decides whether the present regenerative mode is the decelerating regenerative mode or the cruise charging mode. Specifically, the energy distribution control unit 15 makes such a mode decision by deciding whether a change Dap (=θapj (present value)−θapi (previous value) in the accelerator opening θap is smaller than a predetermined negative quantity DapD. Alternatively, the energy distribution control unit 15 may make such a mode decision based on the extra output power POWERex.

If Dap<DapD or POWERex<0 in STEP12, then the energy distribution control unit 15 judges the present regenerative mode as the decelerating regenerative mode, and sets the electric motor output power POWERmot to a decelerating regenerative output power POWERreg in STEP13. The decelerating regenerative output power POWERreg is calculated according to a decelerating regenerative processing routine which will be described later on with reference to FIGS. 15 and 16.

Figure 15:
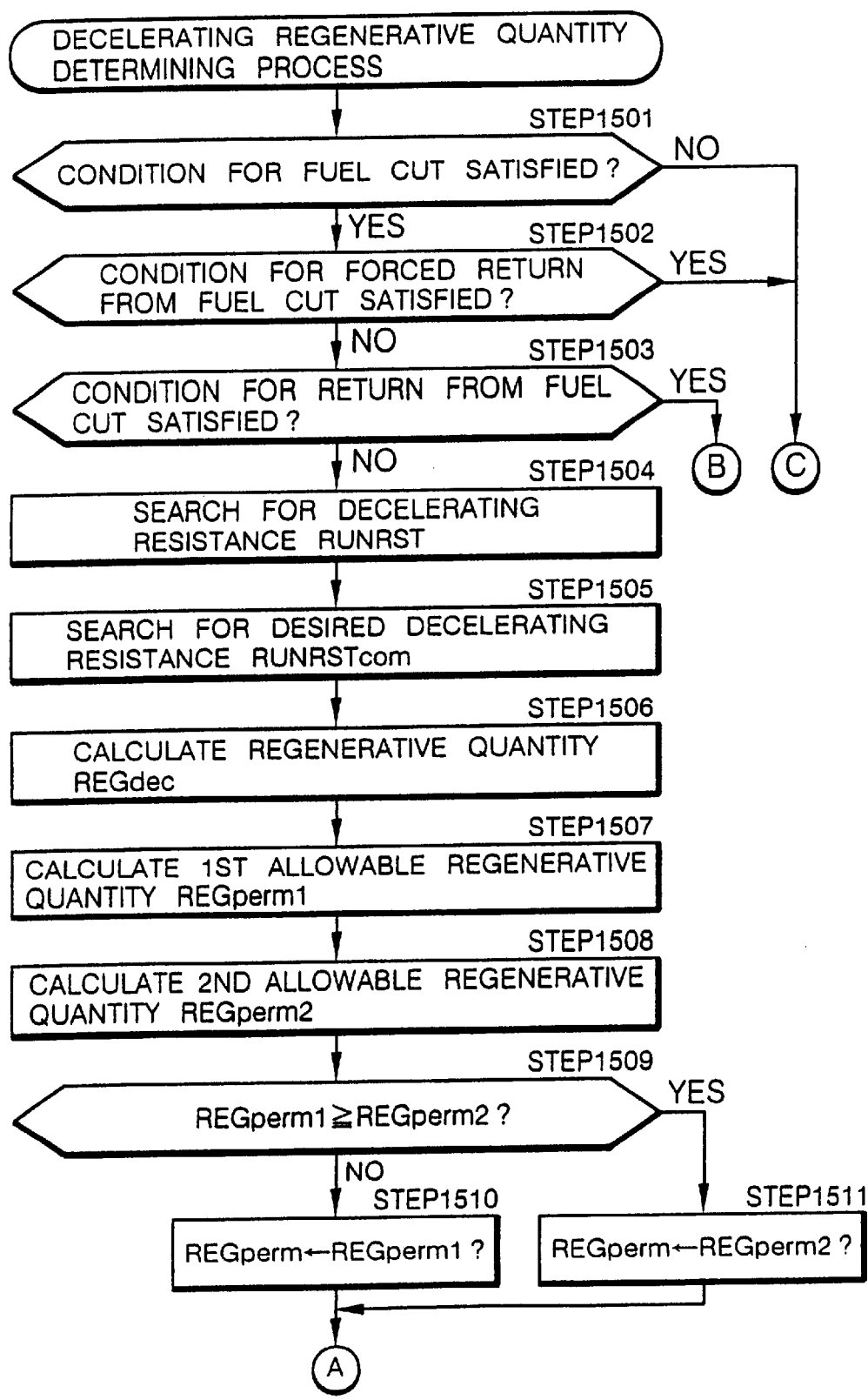
FIGS. 15 and 16 are a flowchart of a processing sequence for determining a decelerating regenerative quantity according to a first embodiment of the present invention.
Figure 16:
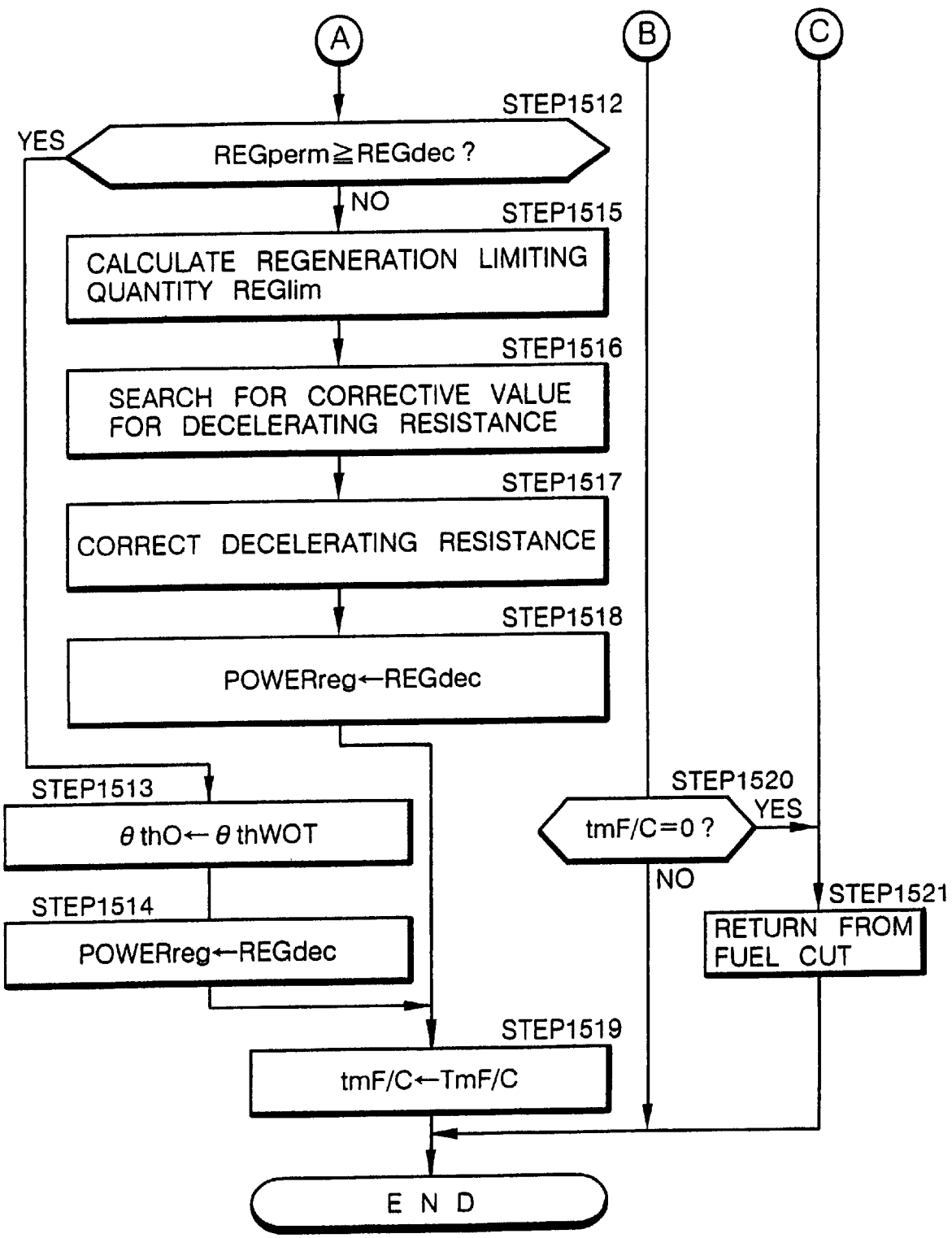

In STEP14, the energy distribution control unit 15 reads an optimum target value θthO for the throttle valve opening in the decelerating regenerative mode, i.e., an optimum target value θthO for the throttle valve opening calculated in the decelerating regenerative processing routine (FIGS. 15 and 16). Thereafter, control proceeds to STEP19.

If Dap≧DapD or POWERex is nearly zero and VSTATUS=0 in STEP12, then the energy distribution control unit 15 judges the present regenerative mode as the cruise charging mode, and sets the electric motor output power POWERmot to a cruise charging output power POWERcrui in STEP15. The cruise charging output power POWERcrui is calculated according to a cruise charging processing routine (not shown).

In STEP16, the energy distribution control unit 15 converts the electric motor output power POWERmot as a target with a time constant into an electric motor torque command TRQcom. In STEP17, the energy distribution control unit 15 calculates a corrective quantity θthSUB for controlling a target value θthO for the throttle valve opening in a valve opening direction, depending on the electric motor torque command TRQcom. Thereafter, control goes from STEP17 to STEP18.

The corrective quantity θthSUB is calculated for the reasons that are opposite to the reasons for which the corrective quantity θthASSIST is calculated as described above.

The electric motor output power POWERmot in the cruise charging mode has a sign opposite to the sign of the electric motor output power POWERmot in the assistive mode. Specifically, in the cruise charging mode, the electric motor 3 is controlled in a direction to reduce the demand drive power POWERcom because of the electric motor torque command TRQcom which is negative. In order to maintain the demand drive power POWERcom in the cruise charging mode, it is necessary to make up for the output power of the electric motor 3 reduced by the electric motor torque command TRQcom, with the output power of the engine 1.

In STEP18, the energy distribution control unit 15 calculates the target value θthO for the throttle valve 103 according to the following equation (4):

$$\theta thO = \theta thi + \theta thADD - \theta thSUB \qquad (4)$$

In STEP19, the energy distribution control unit 15 decides whether or not the calculated target value θthO is equal to or greater than a predetermined reference value θthREF. If θthO<θthREF, the energy distribution control unit 15 decides whether or not an intake pipe absolute pressure Pba is equal to or smaller than a predetermined reference value PbaREF in STEP20.

If Pba>PbaREF, then the processing sequence shown in FIGS. 5 and 6 is finished. If θthO≧θthREF in STEP19 or if Pba≦PbaREF in STEP20, then the energy distribution control unit 15 changes the speed reduction ratio of the transmission mechanism 4 to a lower speed reduction ratio in STEP21. Thereafter, the processing sequence shown in FIGS. 5 and 6 is finished.

When control goes to STEP21, the remaining capacity of the ultracapacitor 14 is reduced thereby to reduce the electric motor output power POWERmot, and the reduction in the electric motor output power POWERmot needs to be made up for by the engine 1, but the output power of the engine 1 cannot be increased anymore. At this time, the speed reduction ratio of the transmission mechanism 4 is changed to a lower speed reduction ratio to keep the torque produced by the drive axle 2 at a constant level, i.e., the same torque as before STEP21, to keep desired drivability of the hybrid vehicle.

An engine control process carried out by the engine control unit 11 will be described below.

Figure 14:
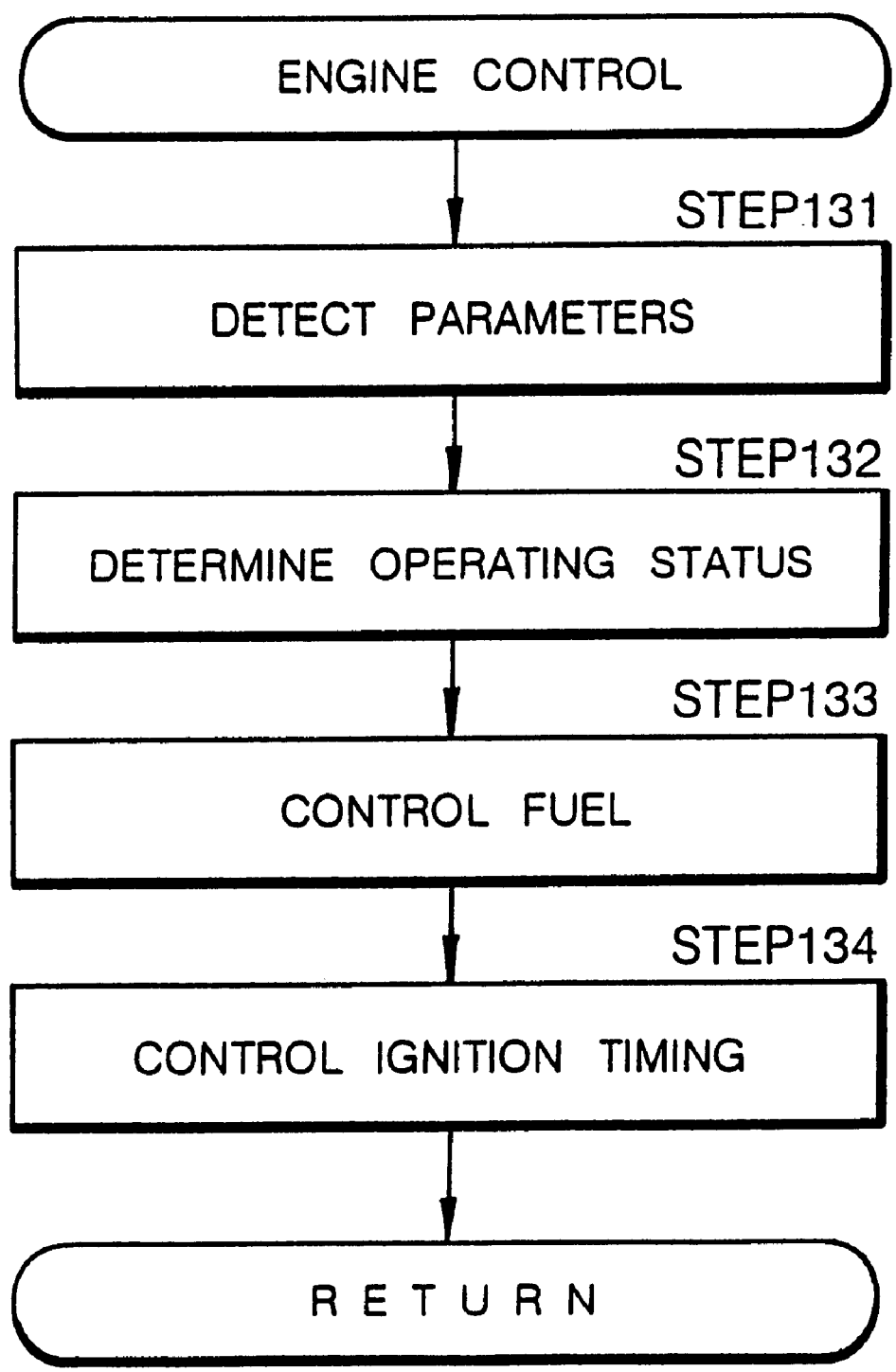
FIG. 14 is a flowchart of an overall engine control processing sequence.

FIG. 14 shows an overall engine control processing sequence, which is executed by the engine control unit 11 in each periodic cycle.

In FIG. 14, the engine control unit 11 detects various engine operating parameters including the engine rotational speed NE, the intake pipe absolute pressure Pba. etc. in STEP131. Then, the engine control unit 11 determines an engine operating status in STEP132, controls fuel to be supplied to the engine 1 in STEP133, and controls ignition timing of the engine 1 in STEP134.

In STEP133, the engine control unit 11 calculates an amount of fuel to be supplied to the engine 1 depending on the read or calculated target value θthO for the throttle valve opening.

FIGS. 15 and 16 show a processing sequence for determining a decelerating regenerative quantity according to a first embodiment of the present invention. The processing sequence shown in FIGS. 15 and 16 is executed by the electric motor control unit 12 at each periodic interval.

As shown in FIG. 15, the electric motor control unit 12 decides whether a condition for a fuel cut is satisfied or not in STEP1501. If a condition for a fuel cut is satisfied, then the electric motor control unit 12 decides whether a condition for forced return from a fuel cut is satisfied or not in STEP1502. If a condition for forced return from a fuel cut is not satisfied, then the electric motor control unit 12 decides whether a condition for return from a fuel cut is satisfied or not in STEP1503.

These conditions are determined by the change Dap in the accelerator opening θap in the determination of the engine operating status in STEP132 (see FIG. 14). For example, if Dap<DapD (a given negative quantity), then a condition for a fuel cut is satisfied. If Dap>DapH (a given positive quantity greater than DapD), then a condition for forced return from a fuel cut is satisfied. If Dap≧DapD, a condition for return from a fuel cut is satisfied.

Figure 17:
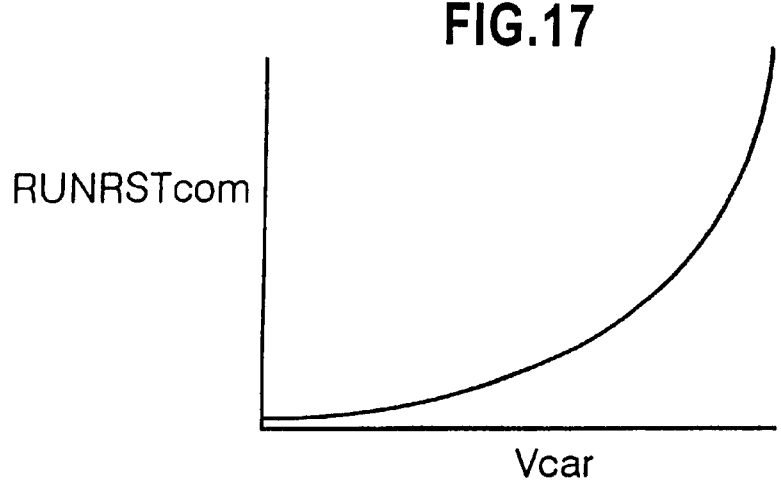
FIG. 17 is a diagram showing a table of desired running resistances RUNRSTcom.

If a condition for return from a fuel cut is not satisfied in STEP1503, the electric motor control unit 12 determines a running resistance RUNRST from the RUNRST table shown in FIG. 12 in STEP1504, and then determines a desired running resistance RUNRSTcom from the RUNRSTcom table in STEP1505. The desired running resistance RUNRSTcom is a braking torque for applying a suitable negative acceleration to the hybrid vehicle. As shown in FIG. 17, the RUNRSTcom table is established such that the desired running resistance RUNRSTcom is greater as the vehicle speed Vcar or the rotational speed of the drive axle 2 is higher.

Then, the electric motor control unit 12 calculates a decelerating regenerative quantity REGdec according to the following equation (5) in STEP1506:

$$REGdec=RUNRSTcom-RUNRST \quad (5)$$

Figure 18:
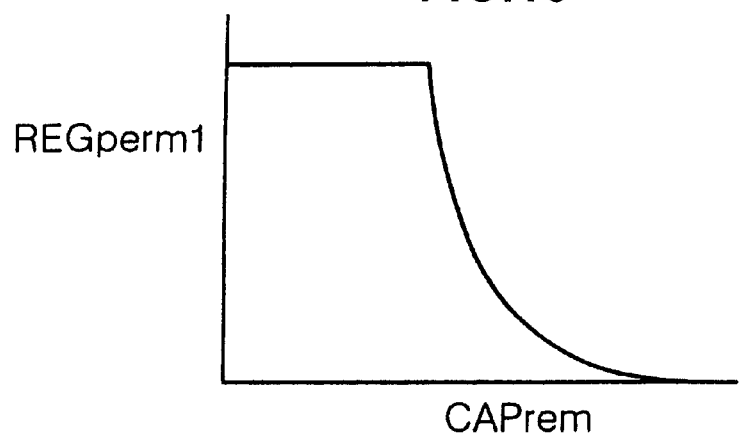
FIG. 18 is a diagram showing a REGperm1 table.

Thereafter, the electric motor control unit 12 determines a first allowable regenerative quantity REGperm1 from a REGperm1 table in STEP1507. As shown in FIG. 18, the REGperm1 table is established such that the first allowable regenerative quantity REGperm1 is constant when the remaining capacity CAPrem of the ultracapacitor 14 is smaller than a predetermined value, and becomes smaller as the remaining capacity CAPrem is greater when the remaining capacity CAPrem is greater than the predetermined value.

Figure 19:
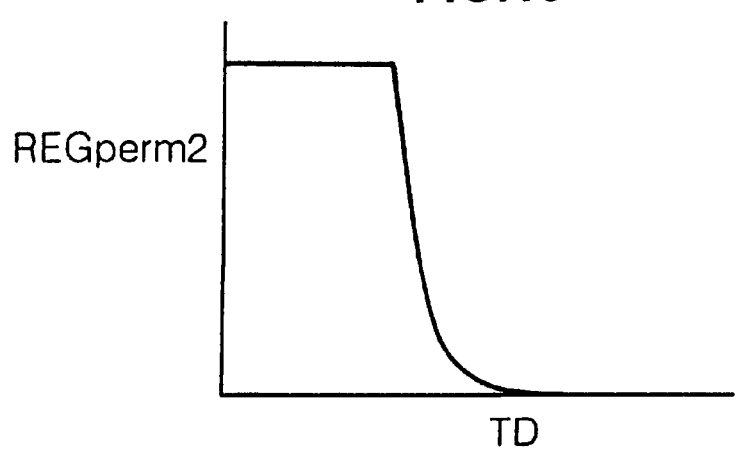
FIG. 19 is a diagram showing a REGperm2 table.

The electric motor control unit 12 then determines a second allowable regenerative quantity REGperm2 from a REGperm2 table in STEP1508. As shown in FIG. 19, the REGperm2 table is established such that the second allowable regenerative quantity REGperm2 is constant when the circuit temperature (protective resistor temperature) TD of the power drive unit 13 is smaller than a predetermined value, and becomes smaller as the protective resistor temperature TD is greater when the protective resistor temperature TD is greater than the predetermined value.

Then, the electric motor control unit 12 decides whether or not the first allowable regenerative quantity REGperm1 is equal to or greater than the second allowable regenerative quantity REGperm2 in STEP1509. If REGperm1<REGperm2, then the electric motor control unit 12 sets a allowable regenerative quantity REGperm to the first allowable regenerative quantity REGperm1 in STEP1510, after which control goes to STEP2212 shown in FIG. 16. If REGperm1≧REGperm2, then the electric motor control unit 12 sets the allowable regenerative quantity REGperm to the second allowable regenerative quantity REGperm2 in STEP1511, after which control goes to STEP1512 shown in FIG. 16.

If the remaining capacity CAPrem of the ultracapacitor 14 or the temperature TD of the protective resistor of the drive circuit for the electric motor 3 is in excess of a predetermined threshold value, the allowable regenerative quantity REGperm may be set to "0" rather than determining the first and second allowable regenerative quantities REGperm1, REGperm2 from the respective tables.

In STEP1512, the electric motor control unit 12 decides whether or not the allowable regenerative quantity REGperm is equal to or greater than the decelerating regenerative quantity REGdec. If REGperm≧REGdec, then the electric motor control unit 12 sets the target opening θthO for the throttle valve 103, which serves as a pumping loss control unit, to a full opening θthWOT in STEP1513. In this manner, the pumping losses of the engine 1 can be reduced. Then, the electric motor control unit 12 sets the decelerating regenerative output power POWERreg to the decelerating regenerative quantity REGdec in STEP1514, sets a countdown timer tmF/C to a predetermined time TmF/C and starts the countdown timer tmF/C in STEP1519. Thereafter, the processing sequence shown in FIGS. 15 and 16 is finished. The predetermined time TmF/C is selected to be a period of time long enough for a suitable amount of new intake air to be maintained after the throttle valve 103 has started its normal control operation.

If REGperm<REGdec in STEP1512, the electric motor control unit 12 calculates a regeneration limiting quantity REGlim according to the following equation (6) in STEP1515:

$$REGlim=REGdec-REGperm \quad (6)$$

Then, the electric motor control unit 12 calculates a corrective value θthCORRECT for the decelerating resistance (deceleration) in STEP1516. The corrective value θthCORRECT is calculated from a θthCORRECT map which uses the regeneration limiting quantity REGlim and the vehicle speed Vcar as parameters. The θthCORRECT map is established such that the corrective value θthCORRECT is smaller as the regeneration limiting quantity REGlim and the vehicle speed Vcar are greater. Then, the electric motor control unit 12 sets the target valve opening θthO for the throttle valve 103 to the corrective value θthCORRECT for thereby correcting the decelerating resistance in STEP1517. When the regenerating operation of the electric motor 3 is limited, therefore, the pumping losses of the engine 1 increase depending on the regeneration limiting quantity REGlim, and the braking torques are not varied.

Then, the electric motor control unit 12 sets the decelerating regenerative output power POWERreg to the decelerating regenerative quantity REGdec in STEP1518. Thereafter, the electric motor control unit 12 executes STEP1519, and then the processing sequence shown in FIGS. 15 and 16 is finished.

If a condition for a fuel cut is not satisfied in STEP1501, or if a condition for forced return from a fuel cut is satisfied in STEP1502, then the electric motor control unit 12 effects return from a fuel cut in STEP1521. Thereafter, the processing sequence shown in FIGS. 15 and 16 is finished.

If a condition for return from a fuel cut is satisfied in STEP1503, then the electric motor control unit 12 decides whether the countdown timer tmF/C has reached "0" or not in STEP1520. If the countdown timer tmF/C has not yet reached "0", then the processing sequence shown in FIGS. 15 and 16 is finished. If the countdown timer tmF/C has reached "0" in STEP1520, then control jumps from STEP1520 to STEP1521.

According to the first embodiment, if the regenerating operation of the electric motor 3 is not limited while the hybrid vehicle is decelerating, since the throttle valve 103 is operated in an opening direction to a substantially fully open position in STEP, the pumping losses of the engine 1 can be lowered, and the regenerative efficiency can be increased (STEP1513). If the regenerating operation of the electric motor 3 is limited, the throttle valve 103 is operated in a more closing direction than if the regenerating operation of the electric motor 3 is not limited, and the target valve opening θthO is established depending on the regeneration limiting quantity REGlim in STEP1515–STEP1517. Consequently, the decelerating resistance is reduced due to the limited regenerating operation, and is increased by an appropriate increase in the pumping losses, so that the braking torques will not vary. Therefore, an uncomfortable feeling which the driver may have due to a change in the deceleration of the hybrid vehicle is reduced, and the drivability of the hybrid vehicle due to the limited regenerating operation is prevented from being impaired.

A second embodiment in which the EGR control valve 121 serves as a pumping loss control unit will be described below. The second embodiment differs from the first embodiment as to the process of determining a decelerating regenerative quantity. System details, control unit details, and other details of the processing sequence according to the second embodiment are identical to those of the first embodiment.

Figure 20:
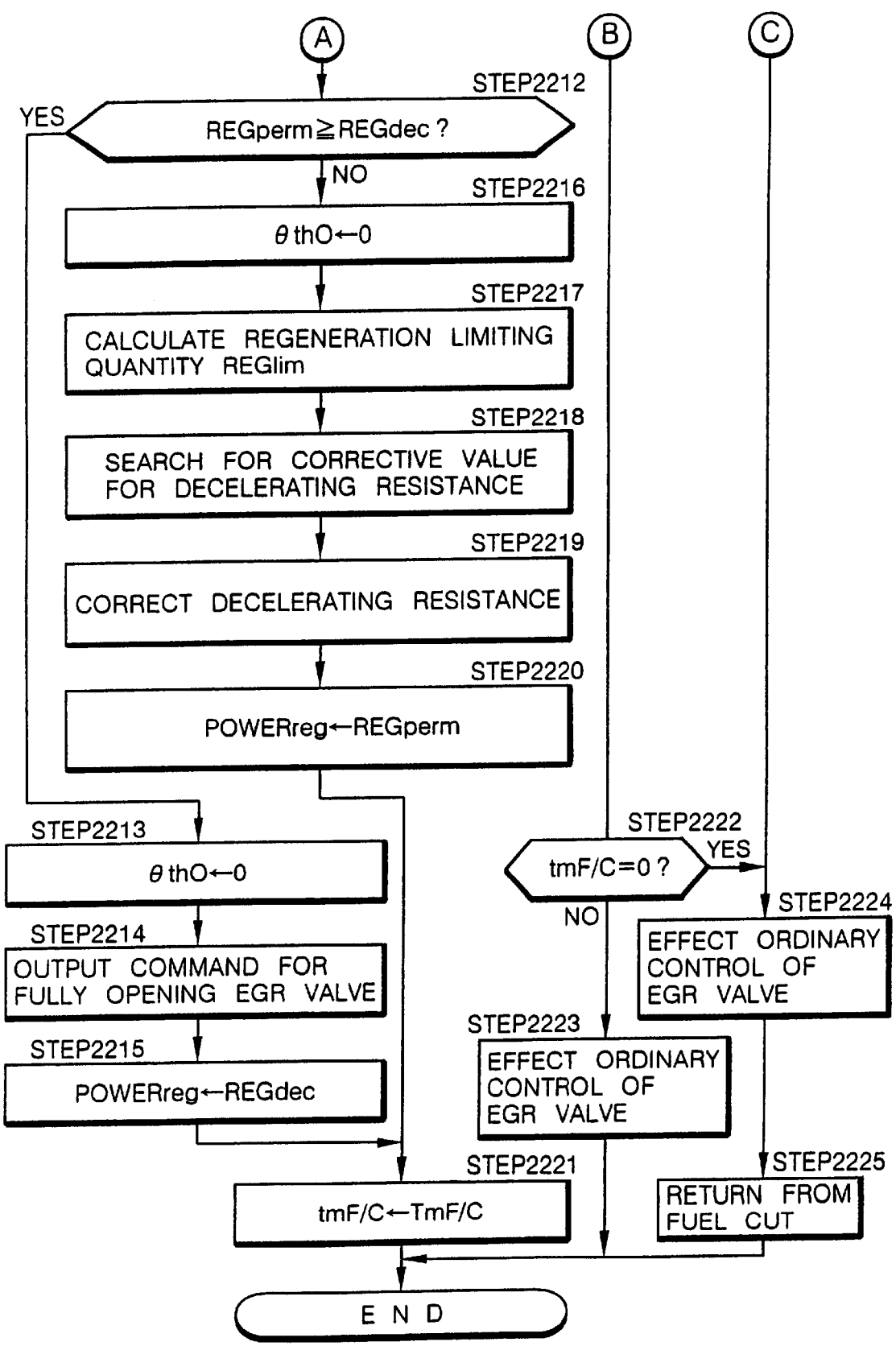
FIG. 20 is a flowchart of a portion of a processing sequence for determining a decelerating regenerative quantity according to a second embodiment of the present invention.

FIGS. 15 and 20 show a processing sequence for determining a decelerating regenerative quantity according to the second embodiment of the present invention. The processing of STEP1501–STEP1511 shown in FIG. 15 according to the second embodiment is the same as the processing of STEP1501–STEP1511 described above.

In STEP2212 shown in FIG. 20, the electric motor control unit 12 decides whether or not the allowable regenerative quantity REGperm is equal to or greater than the decelerating regenerative quantity REGdec. If REGperm≧REGdec, then the electric motor control unit 12 sets the target opening θthO for the throttle valve 103 to "0" (substantially fully closed) in STEP2213, and outputs a command to fully open the EGR control valve 121 in STEP2214. In this manner, the pumping losses of the engine 1 can be reduced, and fresh air is prevented from flowing into the three-way catalytic converter 115.

Figure 21:
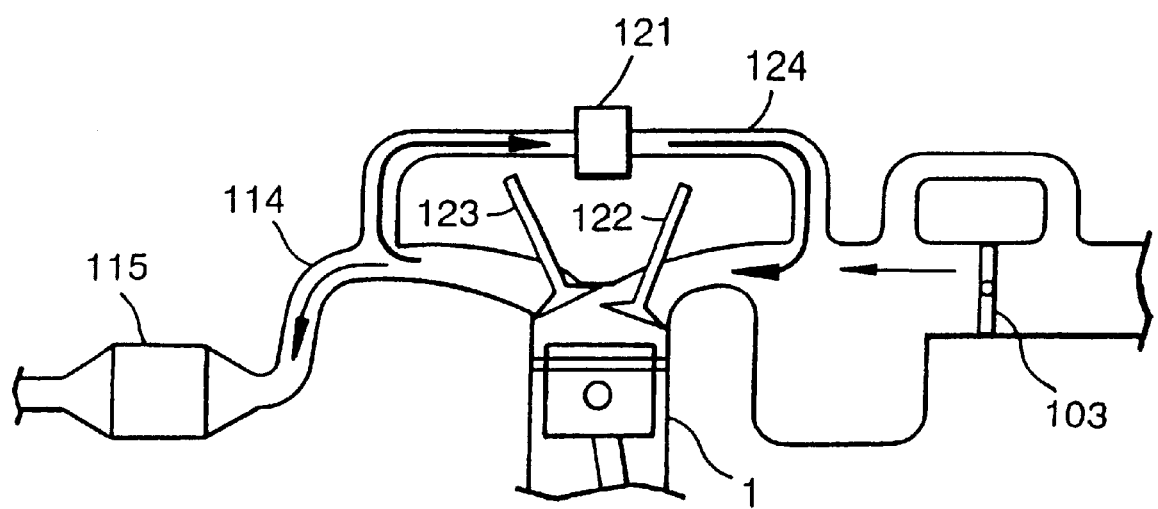
FIG. 21 is a schematic view showing the manner in which an exhaust gas recirculation system operates according to the second embodiment of the present invention.

Specifically, as shown in FIG. 21, the EGR control valve 121.is fully opened to circulate recirculating gases into the engine 1. Therefore, the pumping losses of the engine 1 are reduced. Since high-temperature exhaust gases recirculate, the three-way catalytic converter 115 is prevented from suffering a drop in its temperature.

Referring back to FIG. 20, the electric motor control unit 12 sets the decelerating regenerative output power POWERreg to the decelerating regenerative quantity REGdec in STEP2215, sets a countdown timer tmF/C to a predetermined time TmF/C and starts the countdown timer tmF/C in STEP2221. Thereafter, the processing sequence shown in FIGS. 15 and 20 is finished. The predetermined time TmF/C is selected to be a period of time long enough for the recirculation ratio of the exhaust gases to become normal after the EGR control valve 121 has started its normal control operation.

If REGperm<REGdec in STEP2212, the electric motor control unit 12 sets the target opening θthO for the throttle valve 103 to "0" (substantially fully closed) in STEP2216, and then calculates a regeneration limiting quantity REGlim according to the above equation (6) in STEP2217.

Then, the electric motor control unit 12 calculates a target valve opening θEGRO for the EGR control valve 121 as a corrective value for the decelerating resistance (deceleration) in STEP2218. The target valve opening θEGRO is calculated from a θEGRO map which uses the regeneration limiting quantity REGlim and the vehicle speed Vcar as parameters. The θEGRO map is established such that the target valve opening θEGRO is smaller as the regeneration limiting quantity REGlim and the vehicle speed Vcar are greater. Then, the electric motor control unit 12 outputs a command to control the EGR control valve 121 to reach the target valve opening θEGRO for thereby correcting the decelerating resistance in STEP2219. When the regenerating operation of the electric motor 3 is limited, therefore, the pumping losses of the engine 1 are appropriately increased and the braking torques are not varied, eliminating an uncomfortable feeling which the driver would otherwise have when the hybrid vehicle is decelerated.

Then, the electric motor control unit 12 sets the decelerating regenerative output power POWERreg to decelerating regenerative quantity REGdec in STEP2220. Thereafter, the electric motor control unit 12 executes STEP2221, and then the processing sequence shown in FIGS. 15 and 16 is finished.

If a condition for a fuel cut is not satisfied in STEP1501, or if a condition for forced return from a fuel cut is satisfied in STEP1502, then the electric motor control unit 12 carries out ordinary control of the EGR control valve 121 in STEP2224, and effects return from a fuel cut in STEP2225. Thereafter, the processing sequence shown in FIGS. 15 and 16 is finished.

If a condition for return from a fuel cut is satisfied in STEP1503, then the electric motor control unit 12 decides whether the countdown timer tmF/C has reached "0" or not in STEP2222. If the countdown timer tmF/C has not yet reached "0", then the electric motor control unit 12 carries out ordinary control of the EGR control valve 121 in STEP2223, after which the processing sequence shown in FIGS. 15 and 16 is finished. If the countdown timer tmF/C has reached "0" in STEP2222, then control jumps from STEP2222 to STEP2224.

According to the first embodiment, if the regenerating operation of the electric motor 3 is not limited while the hybrid vehicle is decelerating, the EGR control valve 121 is operated in an opening direction to a, substantially fully open position in STEP2214. Therefore, since the recirculating gases smoothly circulate into the engine 1, the pumping losses of the engine 1 can be lowered, and the regenerative efficiency can be increased.

At the same time, the throttle valve 103 is operated in a closing direction to a substantially fully closed position in STEP2213. Therefore, the amount of any cold fresh air flowing through the throttle valve 103 in response to operation of the engine 1 is small. Since high-temperature exhaust gasses are recirculated, the temperature of the three-way catalytic converter 115 is prevented from falling, and hence the emission characteristics thereof are prevented from being impaired.

If the regenerating operation of the electric motor 3 is limited, the EGR control valve 121 is operated in a more closing direction than if the regenerating operation of the electric motor 3 is not limited, and the target valve opening θEGRO is established depending on the regeneration limiting quantity REGlim in STEP2217–STEP2219. Consequently, the pumping losses increase depending on a reduction in the regenerative torque, so that the braking torques will not vary. Therefore, the drivability of the hybrid vehicle due to the limited regenerating operation is prevented from being impaired. For example, an uncomfortable feeling which the driver may have due to a change in the deceleration of the hybrid vehicle is reduced.

A third embodiment in which the intake valve 122 and the intake valve actuator 125 or the exhaust valve 123 and the exhaust valve actuator 126 serve as a pumping loss control unit will be described below. The third embodiment differs from the first embodiment as to the process of determining a decelerating regenerative quantity. System details, control unit details, and other details of the processing sequence according to the third embodiment are identical to those of the first embodiment.

Figure 22:
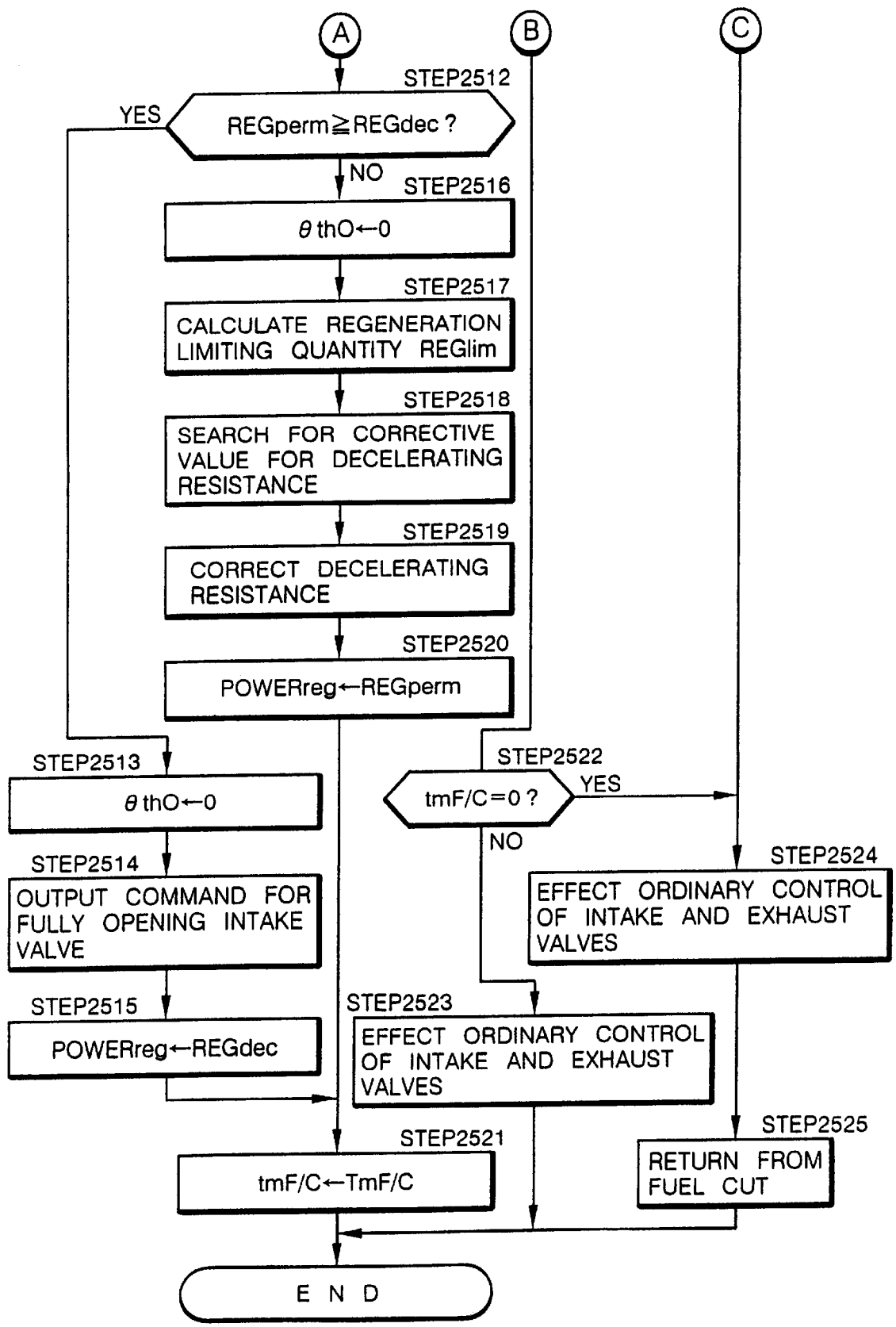
FIG. 22 is a flowchart of a portion of a processing sequence for determining a decelerating regenerative quantity according to a third embodiment of the present invention.

FIGS. 15 and 22 show a processing sequence for determining a decelerating regenerative quantity according to the third embodiment of the present invention. The processing of STEP1501–STEP1511 shown in FIG. 15 according to the third embodiment is the same as the processing of STEP1501–STEP1511 described above.

Figure 23:
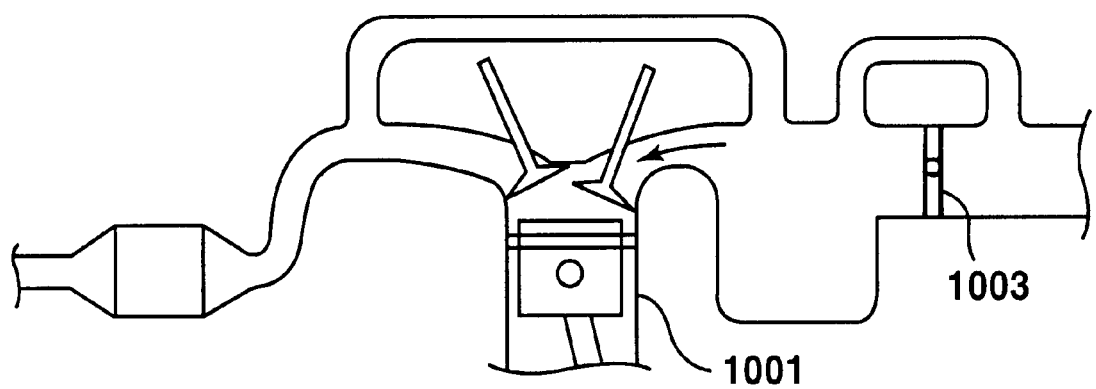
FIG. 23 is a schematic view showing the manner in which an exhaust gas recirculation system operates according to the third embodiment of the present invention.

In STEP2512 shown in FIG. 22, the electric motor control unit 12 decides whether or not the allowable regenerative quantity REGperm is equal to or greater than the decelerating regenerative quantity REGdec. If REGperm≧REGdec, then the electric motor control unit 12 sets the target opening θthO for the throttle valve 103 to "0" (substantially fully closed) in STEP2513, and outputs a command to fully open the intake valve 122 in STEP2514. Since the intake valve 122 is kept open as shown in FIG. 23, the pumping losses are substantially fully lowered, and cold fresh air is prevented from flowing into the exhaust system, so that the three-way catalytic converter 115 will not be excessively cooled.

Referring back to FIG. 22, the electric motor control unit 12 sets the decelerating regenerative output power POWERreg to the decelerating regenerative quantity REGdec in STEP2515, sets a countdown timer tmF/C to a predetermined time TmF/C and starts the countdown timer tmF/C in STEP2521. Thereafter, the processing sequence shown in FIGS. 15 and 21 is finished. The predetermined time TmF/C is selected to be a period of time long enough for a suitable amount of fresh air to be maintained after the intake valve 122 has started its normal control operation.

If REGperm<REGdec in STEP2512, the electric motor control unit 12 sets the target opening θthO for the throttle valve 103 to "0" (substantially fully closed) in STEP2516, and then calculates a regeneration limiting quantity REGlim according to the above equation (6) in STEP2517.

Then, the electric motor control unit 12 calculates a target valve lift LIFTin and a valve opening period Tin for the intake valve 122 as a corrective value for the decelerating resistance (deceleration) in STEP2518. The target valve lift LIFTin and the valve opening period Tin are calculated from a LIFTin map which uses the regeneration limiting quantity REGlim and the vehicle speed Vcar as parameters. The LIFTin map is established such that in most areas, the target valve lift LIFTin and the valve opening period Tin are greater as the regeneration limiting quantity REGlim is smaller and the vehicle speed Vcar is higher.

The electric motor control unit 12 outputs a command to control the intake valve 122 to reach the target valve lift LIFTin and the valve opening period Tin for thereby correcting the decelerating resistance in STEP2519. When the regenerating operation of the electric motor 3 is limited, therefore, the pumping losses of the engine 1 are increased depending on a reduction in the regenerative torque and the braking torques are not varied when the hybrid vehicle is decelerated, preventing the drivability of the hybrid vehicle from being impaired. The decelerating resistance may be corrected by only either one of the target valve lift and the valve opening period.

Then, the electric motor control unit 12 sets the decelerating regenerative output power POWERreg to decelerating regenerative quantity REGdec in STEP2520. Thereafter, the electric motor control unit 12 executes STEP2521, and then the processing sequence shown in FIGS. 15 and 21 is finished.

The same advantages are obtained if the electric motor control unit 12 outputs a command to fully open the exhaust valve 123 in STEP2514. In this case, the electric motor control unit 12 determines a target valve lift LIFTex or a valve opening period Tex for the exhaust valve 123 from a map, and controls the exhaust valve 123 to reach the target valve lift LIFTex or the valve opening period Tex for thereby correcting the decelerating resistance.

If a condition for a fuel cut is not satisfied in STEP1501, or if a condition for forced return from a fuel cut is satisfied in STEP1502, then the electric motor control unit 12 carries out ordinary control of the intake valve 122 and the exhaust valve 123 in STEP2524, and effects return from a fuel cut in STEP2525. Thereafter, the processing sequence shown in FIGS. 15 and 22 is finished.

If a condition for return from a fuel cut is satisfied in STEP1503, then the electric motor control unit 12 decides whether the countdown timer tmF/C has reached "0" or not in STEP2522. If the countdown timer tmF/C has not yet reached "0", then the electric motor control unit 12 carries out ordinary control of the intake valve 122 and the exhaust valve 123 in STEP2523, after which the processing sequence shown in FIGS. 15 and 21 is finished. If the countdown timer tmF/C has reached "0" in STEP2522, then control jumps from STEP2522 to STEP2524.

According to the second embodiment, if the regenerating operation of the electric motor 3 is not limited while the hybrid vehicle is decelerating, the intake valve 122 or the exhaust valve 123 is kept a substantially fully open position in STEP2514. Therefore, the pumping losses of the engine 1 are lowered, and cold fresh air introduced by the operation of the engine 1 is prevented from flowing into the exhaust system. Thus, the temperature of the three-way catalytic converter 115 is prevented from falling, and hence the regenerative efficiency is increased and the emission characteristics are prevented from being impaired.

If the regenerating operation of the electric motor 3 is limited, the intake valve 122 or the exhaust valve 123 which has been kept open is operated in a closing direction, and the target valve lift and the valve opening period are established depending on the regeneration limiting quantity REGlim in STEP2517–STEP2519. Consequently, the pumping losses increase depending on a reduction in the regenerative torque due to the limited regenerating operation, so that the braking torques will not vary. Therefore, the drivability of the hybrid vehicle is prevented from being impaired.

A third embodiment of the present invention will be described below. In the third embodiment, each of the intake valves 122 and each of the exhaust valves 123 are used as a pumping loss control means. Therefore, the third embodiment differs from the first embodiment as to the process of determining a decelerating regenerative quantity. System details, control unit details, and other details of the processing sequence according to the third embodiment are identical to those of the first embodiment.

Figure 24:
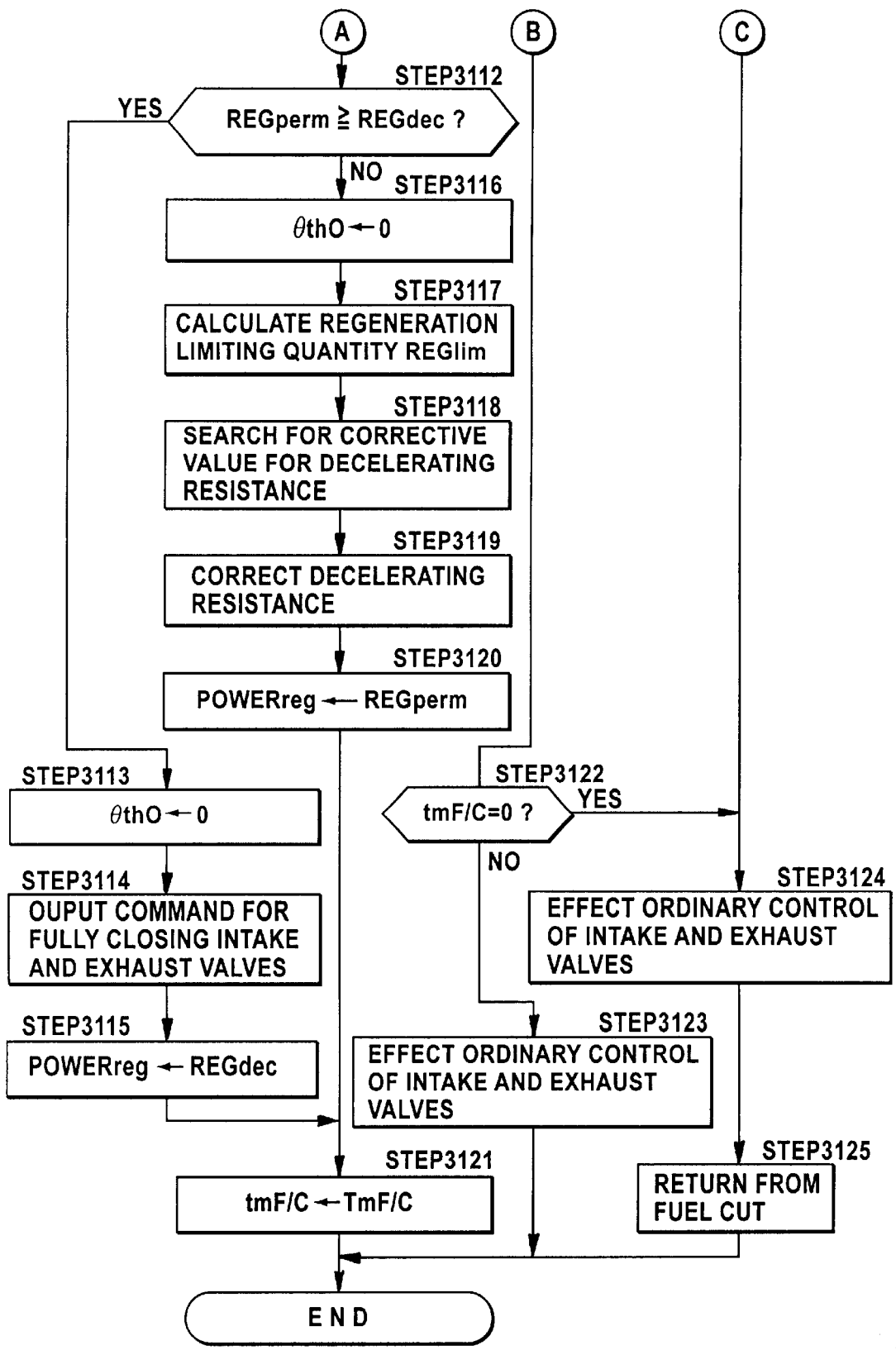
FIG. 24 is a flowchart of a portion of a processing sequence for determining a decelerating regenerative quantity according to a fourth embodiment of the present invention.

FIGS. 15 and 24 show a processing sequence for determining a decelerating regenerative quantity according to the third embodiment of the present invention. The processing of STEP1501–STEP1511 shown in FIG. 15 according to the third embodiment is the same as the processing of STEP1501–STEP1511 described above.

In STEP3112 shown in FIG. 24, the electric motor control unit 12 decides whether or not the allowable regenerative quantity REGperm is equal to or greater than the decelerating regenerative quantity REGdec. If REGperm≧REGdec, then the electric motor control unit 12 sets the target opening θthO for the throttle valve 103 to "0" (substantially fully closed) in STEP3113, and outputs a command to fully close the intake and exhaust valves 122, 123 in STEP3114. The pumping losses of the engine 1 are lowered, and cold fresh air is prevented from flowing into the three-way catalytic converter 115.

Specifically, since the intake and exhaust valves 122, 123 are fully closed, gases do not flow into and out of the combustion chambers. Not only the pumping losses of the engine 1 can be lowered, but also cold fresh air is prevented from flowing into the three-way catalytic converter 115, which will not be excessively cooled.

The electric motor control unit 12 sets the decelerating regenerative output power POWERreg to the decelerating regenerative quantity REGdec in STEP3115, sets a countdown timer tmF/C to a predetermined time TmF/C and starts the countdown timer tmF/C in STEP3121. Thereafter, the processing sequence shown in FIGS. 15 and 24 is finished. The predetermined time TmF/C is selected to be a period of time long enough for a suitable amount of fresh air to be maintained after the intake and exhaust valves 122, 123 have started its normal control operation.

If REGperm<REGdec in STEP3112, the electric motor control unit 12 sets the target opening θthO for the throttle valve 103 to "0" (substantially fully closed) in STEP3116, and then calculates a regeneration limiting quantity REGlim according to the above equation (6) in STEP3117.

Then, the electric motor control unit 12 calculates a target valve lift LIFTin and a valve opening period Tin for the intake valve 122 and a target valve lift LIFTex or a valve opening period Tex for the exhaust valve 123 as a corrective value for the decelerating resistance (deceleration) in STEP3118. The target valve lift LIFTin and the valve opening period Tin and the target valve lift LIFTex and the valve opening period Tex are calculated from a LIFTin·LIFTex map which uses the regeneration limiting quantity REGlim and the vehicle speed Vcar as parameters. The LIFTin·LIFTex map is established such that in most areas, the target valve lift LIFTin and the valve opening period Tin and the target valve lift LIFTex and the valve opening period Tex are greater as the regeneration limiting quantity REGlim is smaller and the vehicle speed Vcar is higher. The pumping losses of the engine 1 are minimum when the intake and exhaust valves 122, 123 are fully closed, and maximum when the intake and exhaust valves 122, 123 are slightly opened to a given open position. When the intake and exhaust valves 122, 123 are further opened from the given open position, the pumping losses of the engine 1 are gradually reduced. Therefore, the LIFTin·LIFTex map is established with respect to the target valve lift LIFTin and the valve opening period Tin and the target valve lift LIFTex and the valve opening period Tex in view of the above behaviors of the pumping losses.

The electric motor control unit 12 outputs a command to control the intake valve 122 to reach the target valve lift LIFTin and the valve opening period Tin and a command to control the exhaust valve 123 to reach the target valve lift LIFTex and the valve opening period Tex for thereby correcting the decelerating resistance in STEP3119. When the regenerating operation of the electric motor 3 is limited, therefore, the pumping losses of the engine 1 are appropriately increased depending on a reduction in the regenerative torque and the braking torques are not varied. The decelerating resistance may be corrected by at least one of the target valve lifts LIFTin, LIFTex and the valve opening periods Tin, Tex.

Then, the electric motor control unit 12 sets the decelerating regenerative output power POWERreg to decelerating regenerative quantity REGdec in STEP3120. Thereafter, the electric motor control unit 12 executes STEP3121, and then the processing sequence shown in FIGS. 15 and 23 is finished.

If a condition for a fuel cut is not satisfied in STEP1501, or if a condition for forced return from a fuel cut is satisfied in STEP1502, then the electric motor control unit 12 carries out ordinary control of the intake and exhaust valves. 122, 123 in STEP3124, and effects return from a fuel cut in STEP3125. Thereafter, the processing sequence shown in FIGS. 15 and 23 is finished.

If a condition for return from a fuel cut is satisfied in STEP1503, then the electric motor control unit 12 decides whether the countdown timer tmF/C has reached "0" or not in STEP3122. If the countdown timer tmF/C has not yet reached "0", then the electric motor control unit 12 carries out ordinary control of the intake and exhaust valves 122, 123 in STEP3123, after which the processing sequence shown in FIGS. 15 and 21 is finished. If the countdown timer tmF/C has reached "0" in STEP3122, then control jumps from STEP3122 to STEP3124.

According to the third embodiment, if the regenerating operation of the electric motor 3 is not limited while the hybrid vehicle is decelerating, the intake and exhaust valves 122, 123 are operated in a closing direction to a substantially fully closed position in STEP3114. Therefore, since almost no gasses flow into and out of the combustion chambers, the pumping losses of the engine 1 are lowered, and cold fresh air is prevented from flowing into the three-way catalytic converter 115. Thus, the temperature of the three-way catalytic converter 115 is prevented from falling, and hence the regenerative efficiency is increased and the emission characteristics are prevented from being impaired.

If the regenerating operation of the electric motor 3 is limited, the intake and exhaust valves 122, 123 are operated in a more opening direction than if the regenerating operation of the electric motor 3 is not limited, and the target valve lifts LIFTin, LIFTex and the valve opening periods Tin, Tex are established depending on the regeneration limiting quantity REGlim in STEP3117–STEP3119. Consequently, the pumping losses increase depending on a reduction in the regenerative torque due to the limited regenerating operation, so that the braking torques will not vary. Therefore, the drivability of the hybrid vehicle is prevented from being impaired.

Rather than employing the intake valve actuators 125 and the exhaust valve actuators 126 to operate the intake and exhaust valves 122, 123, the control system according to the present invention may have a known valve actuating device for varying valve lifts and valve opening and closing periods for the intake and exhaust valves 122, 123, the valve actuating device being capable of disabling selected ones of the intake and exhaust valves 122, 123.

The throttle valve 103 whose opening is controlled by the electrically operated actuator 105 may be replaced with an ordinary throttle valve that is mechanically linked to the accelerator pedal. In such a modification, the amount of intake air depending on the output power of the electric motor may be controlled by a passage bypassing the throttle valve and a control valve disposed in the passage.

In the third embodiment in which the intake and exhaust valves are used as the pumping loss control means, the valve lifts and the valve opening periods of the intake and exhaust valves are continuously varied. However, the engine may incorporate a conventional variable-timing valve operating mechanism in which the valve lifts and the valve opening periods of the intake and exhaust valves can be varied stepwise only when the corrective value for the deceleration resistance exceeds a certain threshold value.

While the ultracapacitor is employed as the electric energy storage unit in the illustrated embodiments, the electric energy storage unit may instead comprise a battery.

Although certain preferred embodiments of the present invention have been shown and described in detail, it should be understood that various changes and modifications may be made therein without departing from the scope of the appended claims.

What is claimed is:

1. A control system for controlling a hybrid vehicle having an engine for rotating a drive axle, an electric motor for assisting the engine in rotating the drive axle and converting kinetic energy of the drive axle into electric energy in a regenerative mode, and electric energy storage means connected through a drive control circuit to the electric motor, for storing electric energy, comprising:

an energy distribution control unit for determining a drive power to be generated by the electric motor based on a drive power of the hybrid vehicle, a vehicle speed of the hybrid vehicle, a remaining capacity of the electric energy storage means, and a running resistance to the hybrid vehicle;

regenerative quantity determining means for determining a regenerative quantity based on the vehicle speed, a decelerating resistance, the running resistance, and the remaining capacity of the electric energy storage means; and pumping loss control means for controlling pumping losses of the engine based on the regenerative quantity determined by said regenerative quantity determining means.

2. A control system according to claim 1, wherein said regenerative quantity determining means comprises first regenerative quantity establishing means for establishing a first regenerative quantity for the electric motor based on the decelerating resistance and the running resistance which are established depending on the vehicle speed, second regenerative quantity establishing means for establishing a second regenerative quantity for the electric motor based on the remaining capacity of the electric energy storage means, and third regenerative quantity establishing means for establishing a third regenerative quantity for the electric motor based on a temperature of the drive control circuit.

3. A control system according to claim 2, wherein said pumping loss controlling means has an exhaust gas recirculation control valve for controlling an amount of exhaust gases recirculated from an exhaust pipe of the engine to an intake pipe thereof, and means for fully opening said exhaust gas recirculation control valve when the electric motor is controlled in the regenerative mode based on said first regenerative quantity, and operating said exhaust gas recirculation control valve in a closing direction depending on said second or third regenerative quantity when the electric motor is controlled in the regenerative mode based on said second or third regenerative quantity.

4. A control system according to claim 2, wherein said pumping loss controlling means has an intake valve or an exhaust valve of the engine and an actuator for fully opening said intake valve or said exhaust valve, and means for controlling said actuator to keep at least one of said intake valve and said exhaust valve fully open when the electric motor is controlled in the regenerative mode based on said first regenerative quantity, and controlling said actuator to vary a valve lift or a valve opening period of said intake valve or said exhaust valve depending on said second or third regenerative quantity when the electric motor is controlled in the regenerative mode based on said second or third regenerative quantity.

5. A control system according to claim 2, wherein said regenerative quantity determining means comprises means for determining a regenerative quantitiy of nil to disable said pumping loss control means if any one of said remaining capacity of the electric energy storage means and said temperature of the drive control circuit exceeds a predetermined threshold.

* * * * *